(12) United States Patent
Shiraishi et al.

(10) Patent No.: US 6,778,202 B1
(45) Date of Patent: Aug. 17, 2004

(54) OPTICAL SCANNING DEVICE HAVING A RESIN LENS

(75) Inventors: Takashi Shiraishi, Kawasaki (JP); Masao Yamaguchi, Funabashi (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/665,177

(22) Filed: Sep. 19, 2000

(30) Foreign Application Priority Data

Sep. 28, 1999 (JP) .......................................... 11-274878

(51) Int. Cl.⁷ .......................... B41J 15/14; B41J 27/00; G02B 26/08
(52) U.S. Cl. ........................ 347/241; 347/256; 359/204
(58) Field of Search ................................ 347/241, 242, 347/243, 244, 256, 258; 264/1–7; 359/204, 205, 206, 208, 207

(56) References Cited

U.S. PATENT DOCUMENTS

| 5,159,193 A | * | 10/1992 | Shiraishi et al. | 250/236 |
| 5,737,112 A | | 4/1998 | Iizuka | 359/205 |
| 5,745,277 A | * | 4/1998 | Boku et al. | 359/207 |
| 5,751,462 A | | 5/1998 | Shiraishi et al. | 359/204 |
| 5,815,301 A | * | 9/1998 | Naiki et al. | 359/205 |
| 6,046,835 A | * | 4/2000 | Yamawaki et al. | 359/205 |
| 6,055,084 A | | 4/2000 | Shiraishi et al. | 359/204 |
| 6,061,162 A | | 5/2000 | Shiraishi et al. | 359/204 |
| 6,084,699 A | | 7/2000 | Shiraishi et al. | 359/204 |
| 6,091,533 A | * | 7/2000 | Iizuka | 359/208 |
| 6,104,519 A | | 8/2000 | Shiraishi et al. | 359/204 |
| 6,104,521 A | * | 8/2000 | Iizuka | 359/205 |
| 6,165,392 A | * | 12/2000 | Kobuchi et al. | 264/1.7 |

FOREIGN PATENT DOCUMENTS

JP 9-189872 7/1997

* cited by examiner

*Primary Examiner*—Hai Pham
(74) *Attorney, Agent, or Firm*—Foley & Lardner LLP

(57) ABSTRACT

An optical scanning device of the present invention includes a light source, forwardly deflecting optical set including a first lens for providing light beams from the light source with a predetermined characteristic, and a second lens for converging the light beams from the first lens in a first direction, a polygonal mirror unit for deflecting the light beams from the forwardly deflecting optical set into a second direction substantially perpendicular to the first direction, and a third lens for forming the light beams deflected by the polygonal mirror unit as an image onto a predetermined image surface at substantially equal speed. The second lens includes a resin lens and a glass cylinder lens.

3 Claims, 17 Drawing Sheets

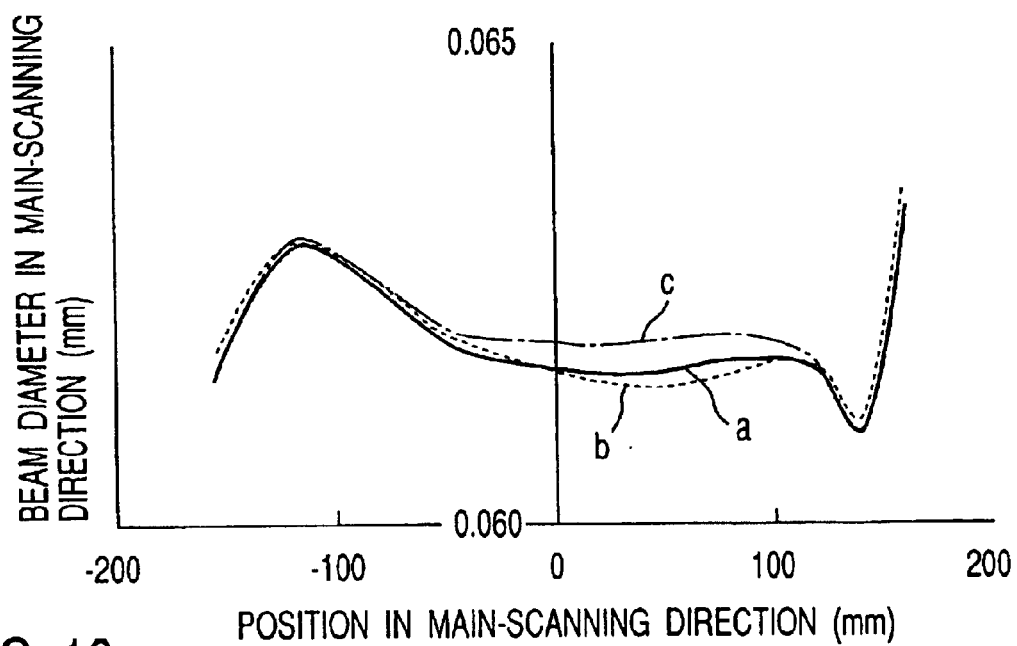
F I G. 16
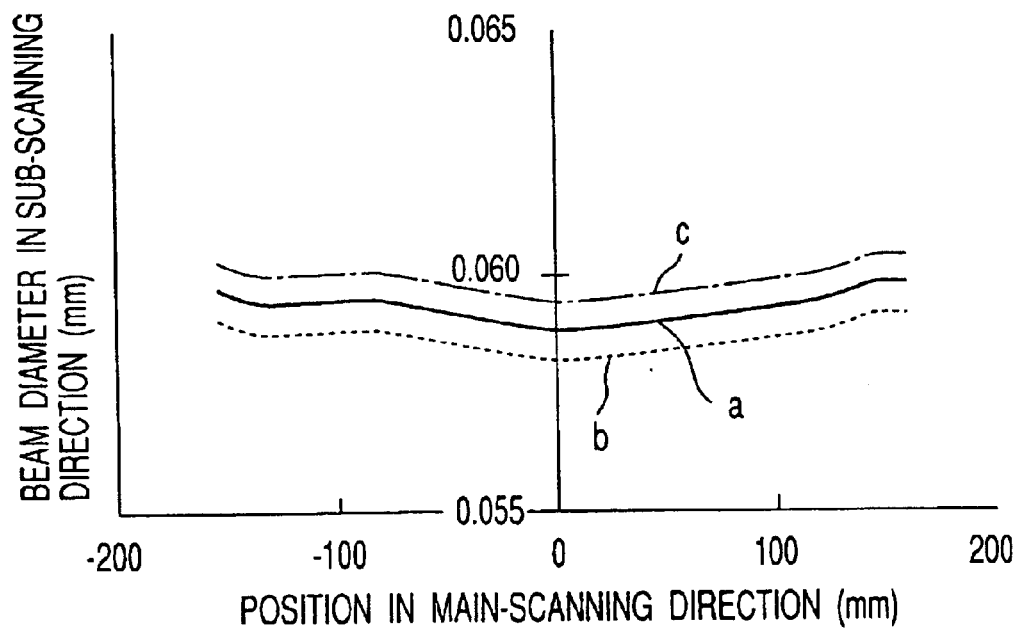
F I G. 17

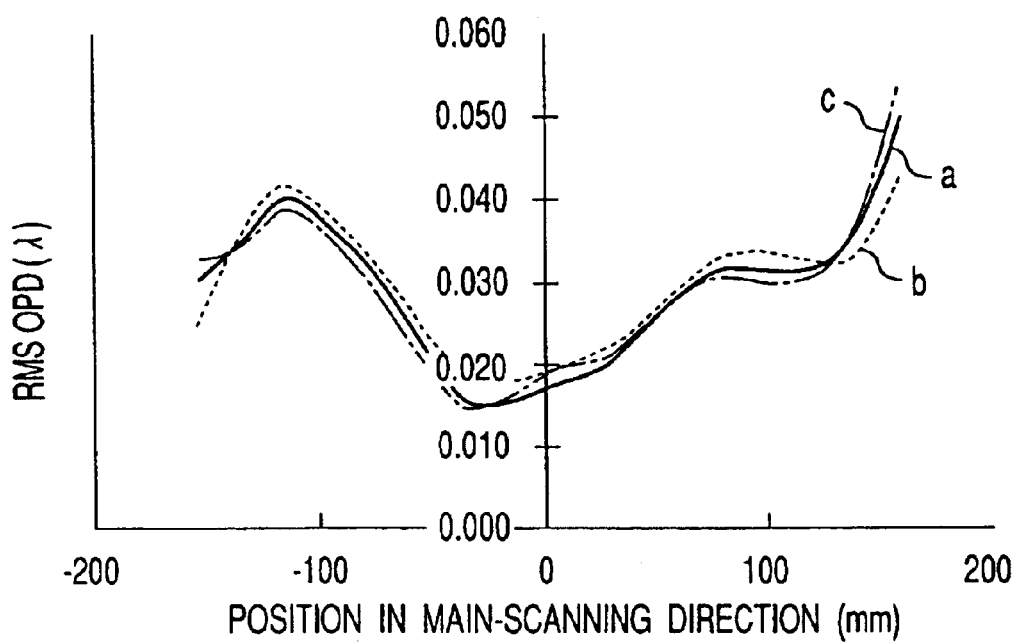
F I G. 20
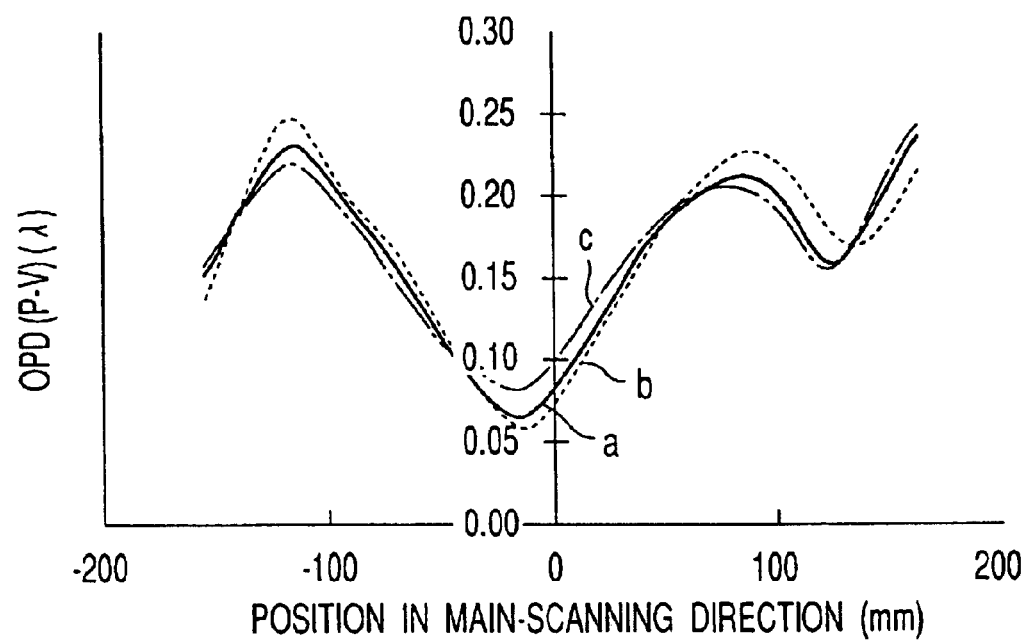
F I G. 21

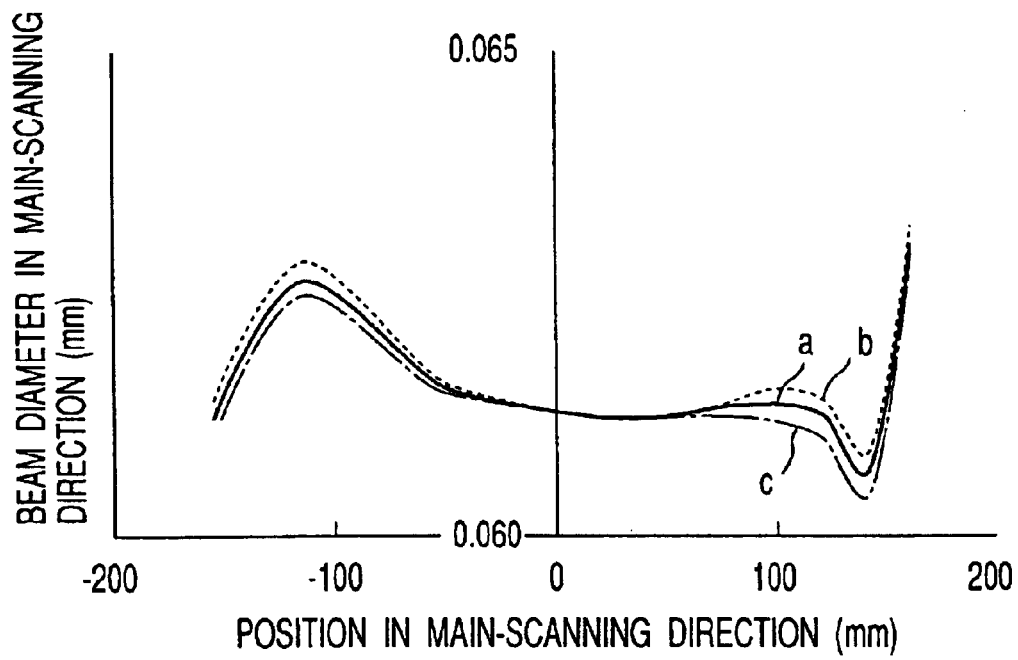
F I G. 22
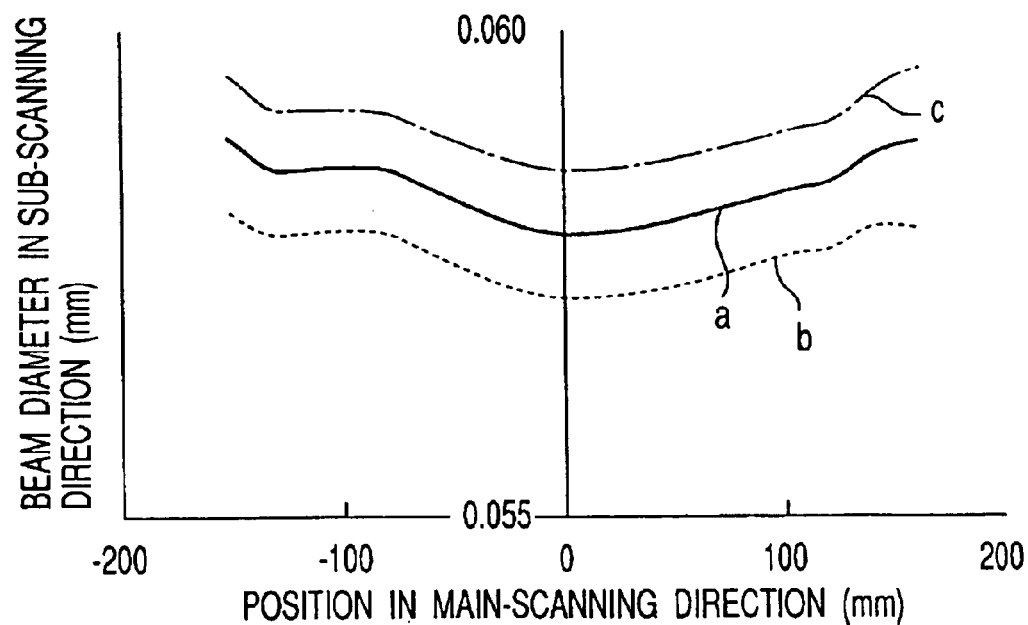
F I G. 23

OPTICAL SCANNING DEVICE HAVING A RESIN LENS

CROSS-REFERENCE TO RELATED APPLICATIONS

This application is based upon and claims the benefit of priority from the prior Japanese Patent Application No. 11-274878, filed Sep. 28, 1999, the entire contents of which are incorporated herein by reference.

BACKGROUND OF THE INVENTION

The present invention relates to a multi-beam optical scanning device capable of being utilized for a multi-drum type color printer, a multi-drum type color copier, a high-seed laser printer, a digital copier and the like for scanning a plurality of beams.

In an image forming apparatus such as the multi-drum type color printer or the multi-drum type color copier, for example, a plurality of image forming units corresponding to separated color components, and an optical scanning device (laser light exposure apparatus) for supplying, to the image forming units, image data, i.e., a plurality of laser beams corresponding to the color components are used.

Two types of this kind of image forming apparatuses are known, i.e., a type in which a plurality of optical scanning devices corresponding to the image forming units are disposed, and a type in which a multi-beam optical scanning device capable of supplying a plurality of laser beams is disposed.

The optical scanning device includes a plurality of semiconductor laser elements (laser diodes) as light sources, a first lens group (forwardly deflecting optical system) for reducing a sectional beam diameter of each of a plurality of laser beams ejected from each of the laser diodes, a polygonal mirror unit for continuously reflecting the plurality of laser beams stopped down by the first lens group in a direction perpendicular to a direction into which a photosensitive member is transferred, and a second lens group (post deflecting optical system) for forming an image of the laser beams deflected by the polygonal mirror unit onto a predetermined position of the photosensitive member. In many cases, a direction in which the laser beams are deflected by the polygonal mirror unit is indicated as a sub-scanning direction perpendicular to the direction into which the photosensitive member is transferred, i.e., a main-scanning direction.

The plurality of laser beams which has passed through the first lens group are continuously reflected (deflected) by a reflecting surface of a polygonal mirror which is rotated at a predetermined rotation number, and are deflected to the main-scanning direction. Each deflected laser beam is formed as an image on a predetermined position of the photosensitive member.

The second lens group provides the laser beam scanned by the polygonal mirror with substantially the same sectional beam diameter on the photosensitive member, and provides the laser beam with different focusing degree whenever the beam is reflected by the polygonal mirror.

If a plastic lens having a surface-inclination correcting function is used in the post deflecting optical system (second lens group) of the above-described optical scanning device, it is necessary to avoid influence of temperature and moisture. To avoid this, Jpn. Pat. Appln. KOKAI Publication No. 9-189872 and the like proposed a hybrid cylinder lens having a resin cylinder lens which has a negative power in the sub-scanning direction but does not have a power in the main-scanning direction, and a glass cylinder lens having a positive power in the sub-scanning direction.

when the hybrid cylinder lens including the plastic lens having the surface-inclination correcting function is used in the post deflecting optical system as described above, since the a radius of curvature is constant in the sub-scanning direction, it is difficult to set spherical aberration and coma aberration to predetermined values to cancel the spherical aberration and the coma aberration generated in the post deflecting optical system. This deteriorates RMS-OPD on an image surface, and there is a problem that a flare in the sub-scanning direction and the like are increased.

Further, the conventional optical scanning device only has the same function as a flat plate in the main-scanning direction, and the aberration and the like can not be provided positively. Therefore, it is difficult to correct the spherical aberration generated in the post deflecting optical system. This deteriorates RMS-OPD on an image surface, and there is a problem that a flare in the main-scanning direction and the like are increased.

Further, in the case of the hybrid lens, since it is necessary that a concave surface of the plastic lens and a convex surface of the glass cylinder lens having the positive power in the sub-scanning direction must have the same curvatures, it is difficult to optimize both the coma aberration and the spherical aberration.

If surfaces having curvatures of the glass lens and the plastic lens are connected to each other, automatic aligning mechanism functions, and there is a merit that parallelism of the buses can be maintained, but on the other hand, if the shape of the plastic lens loses and non-contact surface is created between the plastic lens and the glass lens, the contacting surface has the curvature of glass and the non-contact surface has the curvature of plastic and as a result, the lens has two focal points. Therefore, there is a problem that a flare is generated in the image surface and the beam diameter is increased.

BRIEF SUMMARY OF THE INVENTION

It is an object of the present invention to provide an optical scanning device capable of preventing a flare from being generated and a beam diameter from increasing by using a post deflecting optical system including a plastic lens.

The present invention provides an optical scanning device comprising: a light source; forwardly deflecting optical set including a first lens for providing light beams from the light source with a predetermined characteristic, and a second lens for converging the light beams from the first lens in a first direction; a polygonal mirror unit for deflecting the light beams from the forwardly deflecting optical set into a second direction substantially perpendicular to the first direction; a third lens for forming the light beams deflected by the polygonal mirror unit as an image onto a predetermined image surface at substantially equal speed; wherein the second lens includes a resin lens and a glass cylinder lens made of glass having a positive power in the first direction and wherein the resin lens of the second lens having a surface whose radius of curvature in the first direction is varied along the first direction.

Further, the present invention provides an optical scanning device comprising: a light source; forwardly deflecting optical set including a first lens for providing light beams from the light source with a predetermined characteristic, and a second lens for converging the light beams from the first lens in a first direction; a polygonal mirror unit for deflecting the light beams from the forwardly deflecting optical set into a second direction substantially perpendicular to the first direction; a third lens for forming the light beams deflected by the polygonal mirror unit as an image onto a predetermined image surface at substantially equal speed; wherein the third lens having a positive power in the second direction, and the second lens-having a power in the second direction.

Furthermore, the present invention provides an optical scanning device comprising: a light source; forwardly deflecting optical Bet including a first lens for providing light beams from the light source with a predetermined characteristic, and a second lens for converging the light beams from the first lens in a first direction; a polygonal mirror unit for deflecting the light beams from the forwardly deflecting optical set into a second direction substantially perpendicular to the first direction; a third lens for forming the light beams deflected by the polygonal mirror unit as an image onto a predetermined image surface at substantially equal speed; wherein the second lens includes a resin lens including a surface having a negative power in the first direction, and a glass lens including one convex surface having a positive power in the first direction, the resin lens of the second includes a projection which abuts in a direction of the convex surface of the glass lens, and wherein the projection of the resin lens and the glass cylinder lens contact with each other.

Still further, the present invention provides an optical scanning device comprising: a light source; forwardly deflecting optical set including a first lens for providing light beams from the light source with a predetermined characteristic, and a second lens for converging the light beams from the first lens in a first direction; a polygonal mirror unit for deflecting the light beams from the forwardly deflecting optical set into a second direction substantially perpendicular to the first direction; a third lens for forming the light beams deflected by the polygonal mirror unit as an image onto a predetermined image surface at substantially equal speed; wherein the second lens includes a resin lens including a surface having a negative power in the first direction, and a glass lens including one convex surface having a positive power in the first direction, a deformable sheet having a substantially constant thickness is provided between the resin lens and the glass cylinder lens, and each of the resin lens and the glass cylinder lens has a space portion when both the lenses come into contact with each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 16 is a graph showing a beam diameter in a main-scanning direction of the optical scanning device of the third embodiment;

FIG. 17 is a graph showing the beam diameter in a sub-scanning direction of the optical scanning device of the third embodiment;

FIG. 20 is a graph showing RMS-OPD in an optical scanning device of a fourth embodiment;

FIG. 21 is a graph showing OPD (p-v) in the optical scanning device of the fourth embodiment;

FIG. 22 is a graph showing a beam diameter in a main-scanning direction of the optical scanning device of the fourth embodiment;

FIG. 23 is a graph showing the beam diameter in a sub-scanning direction of the optical scanning device of the fourth embodiment;

DETAILED DESCRIPTION OF THE INVENTION

An embodiment of an optical scanning device and an image forming apparatus utilizing the optical scanning device of the present invention will be explained in detail with reference to the drawings below.

Figure 1:
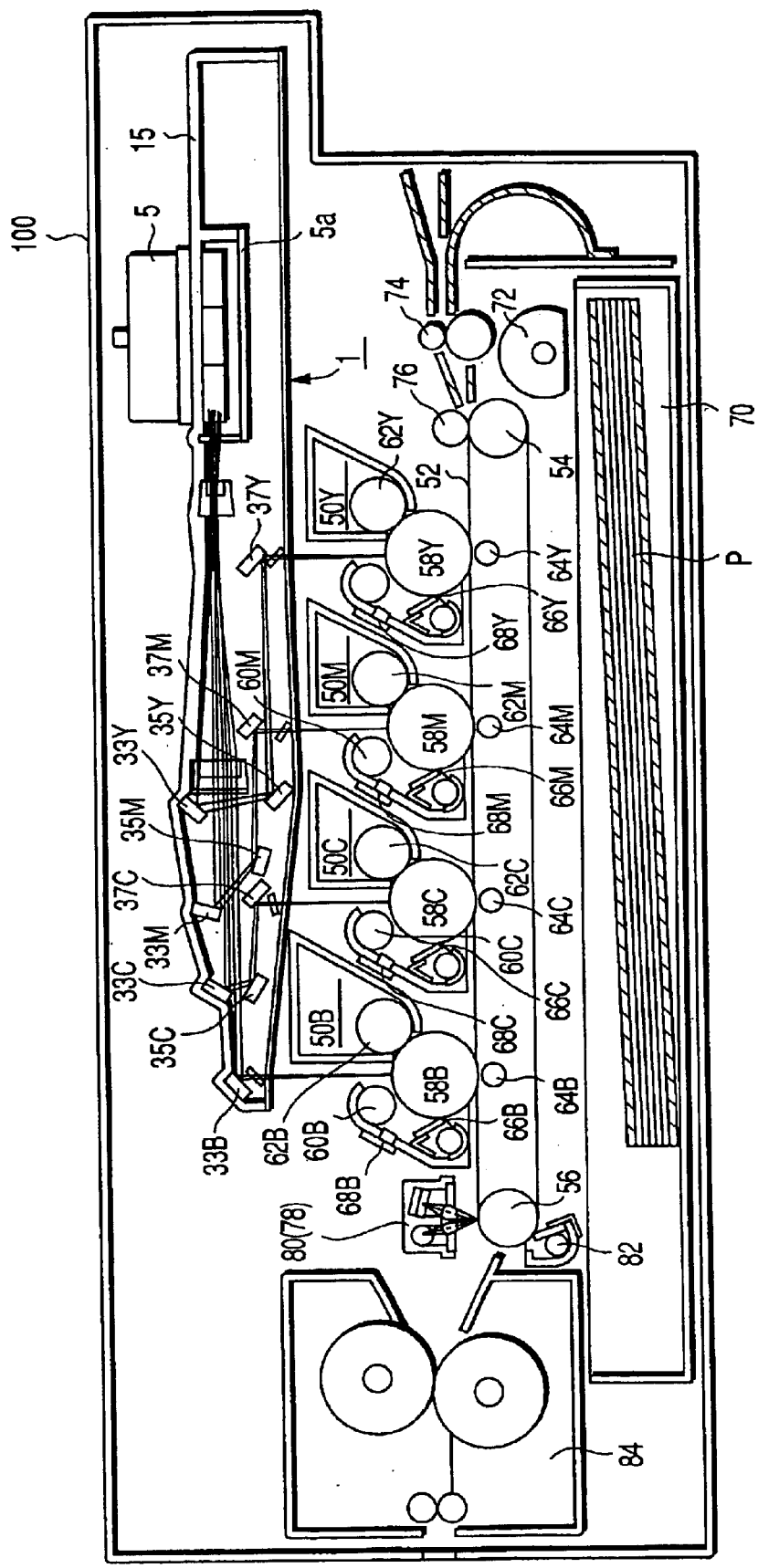
FIG. 1 is a schematic sectional view of an image forming apparatus in which a multi-beam optical scanning device of embodiments of the present invention is utilized.

FIG. 1 shows a color image forming apparatus in which a multi-beam optical scanning device which is a first embodiment of the present invention is utilized. In this kind of color image forming apparatus, various four sets of apparatuses are utilized for forming images for each of four kinds of image data separated into Y, i.e., yellow; M, i.e., magenta; C, i.e., cyan; and B, i.e., black, and color components respectively corresponding to Y, M, C and B. Therefore, Y, M, C and B are added to each of reference symbols to identify apparatuses corresponding to the image data of color components.

As shown in FIG. 1, the image forming apparatus 100 has first to fourth image forming sections 50Y, 50M, 50C and 50B for forming images separately for separated color components, Y, M, C, and B.

The image forming sections 50Y, 50M, 50C and 50B are arranged in series in this order below an optical scanning device 1 at locations corresponding to positions where laser beams L (Y, M, C and B) corresponding to respective color component images are ejected through third loopback mirrors 37Y, 37M, 37C and first loopback mirror 33B of the multi-beam optical scanning device 1 which will be described later using FIG. 8.

A transfer belt 52 for transferring a transfer material on which an image formed by each of the image forming section 50 (Y, M, C and B) is to be transferred is disposed below each of the image forming sections 50 (Y, M, C and B).

The transfer belt 52 is wound around a belt driving roller 56 and a tension roller 54 which are rotated in a direction of arrow, and the transfer belt 52 is rotated at a predetermined speed by a motor (not shown) in a direction to which the belt driving roller 56 is rotated.

Each of the image forming sections 50 (Y, M, C and B) is formed into a cylindrical drum shape such that the image forming section 50 can rotate in the direction of arrow. The image forming sections 50 (Y, M, C and B) respectively includes photoreceptor drums 58Y, 58M, 58C and 58B on which electrostatic latent image corresponding to the image is to be formed.

Around each of the photoreceptor drums 58 (Y, M, C and B), the following members are disposed in the named order along a rotational direction of the photoreceptor drums 58, charging apparatuses 60 (Y, M, C and B) for supplying predetermined potential to surfaces of the photoreceptor drums 58 (Y, M, C and B), developing apparatuses 62 for supplying toner having colors corresponding to the electrostatic latent image corresponding to the image formed on the surfaces of the photoreceptor drums 58 (Y, M, C and B), thereby developing the images, transferring apparatuses 64 (Y, M, C and B) facing the photoreceptor drums 58 (Y, M, C and B) in a state where the transfer belts 52 are interposed between the photoreceptor drums 58,(Y, M, C and B) and the transferring apparatuses 64 (Y, M, C and B) for transferring toner images of the photoreceptor drums 58 (Y, M, C and B) to transferred material, i.e., paper P sheet, cleaners 66 (Y, M, C and B) for removing residue toner remaining on the photoreceptor drums 58 (Y, M, C and B) after the toner images were transferred through the transferring apparatuses 64 (Y, M, C and B), and negative charging apparatuses 68 (Y, M, C and B) for removing residue potential remaining on the photoreceptor drums 58 (Y, M, C and B) after the toner images were transferred through the transferring apparatuses 64 (Y, M, C and B).

Light beams for writing latent images onto the photoreceptor drums 58 (Y, M, C and B) respectively becomes two beams in the sub-scanning direction on the photoreceptor drums 58 guided by the mirrors 37 (Y, M, C and B) of the optical scanning device 1.

The laser beams L (Y, M, C and B) including combined two light beams are applied between the charging apparatuses 60 (Y, M, C and B) and the developing apparatuses 62 (Y, M, C and B) respectively.

A paper cassette 70 for accommodating the paper sheets P on which images formed by the image forming section 50 (Y, M, C and B) are to be transferred is disposed below the transfer belt 52.

A substantially semicircular feed roller 72 for taking out the paper sheets P one sheet-by-one sheet from the top of the paper sheets P accommodated in the paper cassette 70 is disposed at one end side of the paper cassette 70 closer to the tension roller 54

A registration roller 74 is disposed between the feed roller 72 and the tension roller 54 for aligning a tip end of the one paper sheet P taken out from the paper cassette 70 with a tip end of the toner image formed on the photoreceptor drum 58B of the image forming section 50B (black).

An absorption roller 76 is disposed between the registration roller 74 and the first image forming section 50Y in the vicinity of the tension roller 54 on an outer periphery of the tension roller 54 such as to sandwich the transfer belt 52 between the tension roller 54 and the absorption roller 76. The absorption roller 76 supplies a predetermined electrostatic absorbing force. An axis of the absorption roller 76 and an axis of the tension roller 54 are set parallel to each other.

Registration sensors 78 and 80 are disposed on one end of the transfer belt 52 in the vicinity of the belt driving roller 56 on the outer periphery of the belt driving roller 56 such as to sandwich the transfer belt 52 between the registration sensors 78 and 80 and the belt driving roller 56. The registration sensors 78 and 80 detect positions of images formed on the paper sheets P transferred by the transfer belt 52 or a transfer belt. The registration sensors 78 and 80 are disposed at a predetermined distance in an axial direction of the belt driving roller 56 (since FIG. 1 is a sectional front view, only the rear sensor 80 is shown).

A transfer belt cleaner 82 for removing toner or paper residues of paper sheets P attached on the transfer belt 52 is disposed on the transfer belt 52 at location corresponding to the belt driving roller 56.

A fixing apparatus 84 for fixing, to the paper sheets P, the toner image transferred onto the paper sheets P is disposed in a direction to which the paper sheets P transferred through the transfer belt 52 moves away from the tension roller 56 and further transferred.

Figure 2:
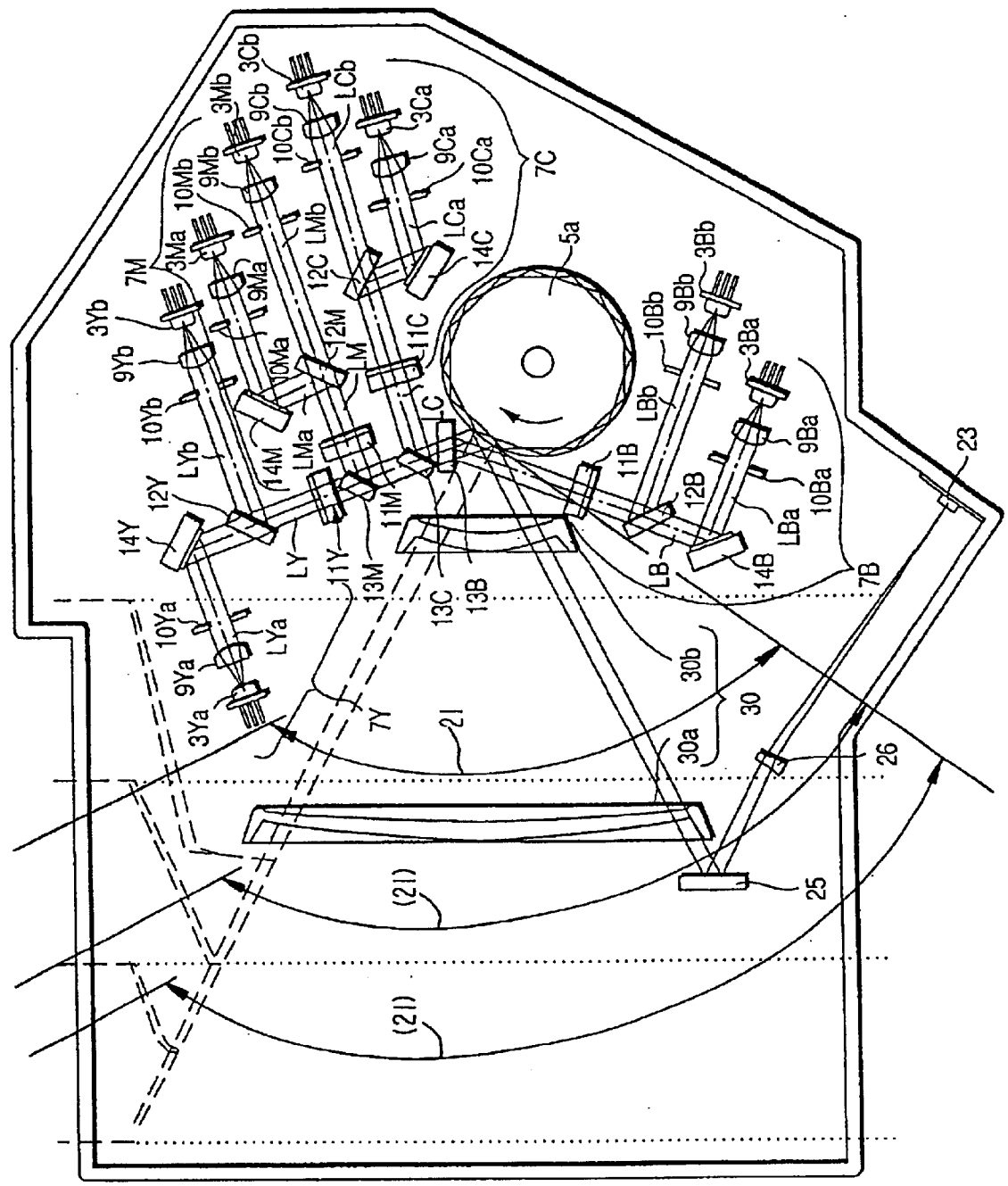
FIG. 2 is a schematic plane view showing a layout of optical members of the optical scanning device incorporated in the image forming apparatus shown in FIG. 1.
Figure 3:
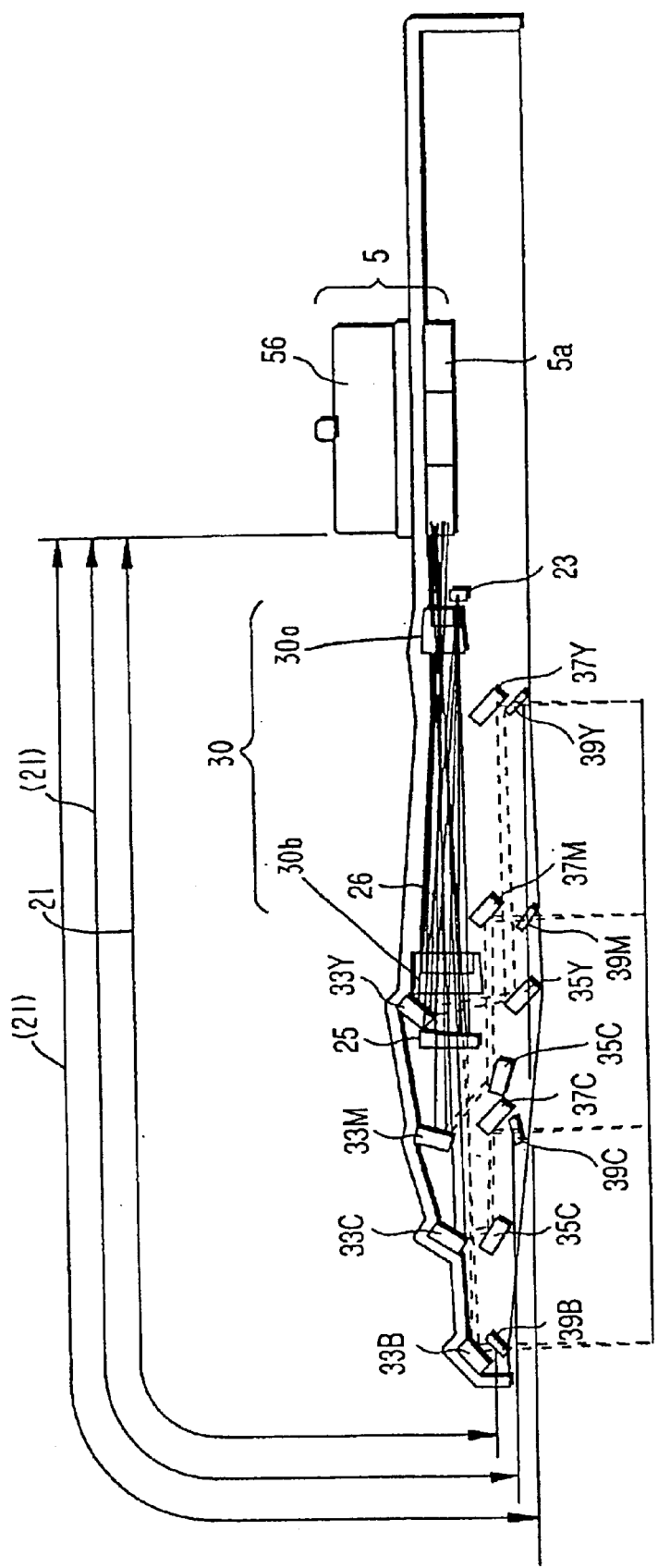
FIG. 3 is a schematic sectional view for explaining a state of the optical scanning device shown in FIG. 2 in which a reflection point of a deflector and a central portion of the post deflecting optical system in the sub-scanning direction are cut.

FIG. 2 shows the multi-beam optical scanning device utilized in the color image-forming apparatus shown in FIG. 1.

As shown in FIG. 2, the multi-beam optical scanning device 1 includes a single deflector (polygonal mirror unit) 5 as deflecting means for deflecting laser beams ejected from a laser element as a light source toward predetermined positions of an image surface disposed at a predetermined position, i.e., the photoreceptor drums 58 (Y, M, C and B) of the first to fourth image forming sections 50 (Y, M, C and B) shown in FIG. 1. A direction in which the laser beams are deflected by the polygonal mirror unit 5 is called as a main-scanning direction hereinafter.

The polygonal mirror unit 5 includes a polygon mirror body 5a in which octahedral plane reflection mirrors (surface) are disposed equilaterally, and a motor 5b for rotating the polygon mirror body 5a at a predetermined speed in the main-scanning direction.

The polygon mirror body 5a is made of aluminum for example. Each of the reflection surfaces of the polygon mirror body 5a is formed by cutting the reflection surfaces along the sub-scanning direction perpendicular to the surface including the rotation direction of the polygon mirror body 5a, i.e., the main-scanning direction and then by evaporating a surface protecting layer such as $S_iO_2$ onto the cut surfaces.

Disposed between the polygonal mirror unit 5 and the image surface is a post deflecting optical system 30 having first and second image-forming lenses 30a and 30b for providing the laser beams deflected into a predetermined direction by the reflecting surface of the polygonal mirror unit 5 with a predetermined optical characteristic. Further, a single sub-scanning direction beam position/main-scanning direction timing detecting sensor 23 for detecting that the individual beams of the laser beams L (Y, M, C and B) ejected from the second image-forming lens 30b of the post deflecting optical system 30 reach a predetermined position in front of a region where the image is written is also disposed between the polygonal mirror unit 5 and the image surface. A prism 26 is also disposed between the polygonal mirror unit 5 and the image surface. The prism 26 is located between the post deflecting optical system 30 and the sub-scanning direction beam position/main-scanning direction timing detecting sensor 23. A batch of laser beam L (Y, M, C and B) including two+two+two+two, i.e., eight laser beams which had passed through the two lenses 30a and 30b of the post deflecting optical system 30 is reflected into the sub-scanning direction if the laser beams are guided by the individual photoreceptor drums 58 when the polygon mirror body 5a of the polygonal mirror unit 5 swings through a predetermined angle, and is reflected into a direction other than the sub-scanning direction if the beam guided by another photoreceptor drums 58 so that the prism 26 which is an optical element varies an ejection angle by wavelength for canceling the variation of position by a lens by influence of the variation of the wavelength so that positions of the beams in the main-scanning direction on a loopback mirror 25 for sub-scanning direction beam position/main-scanning direction timing detecting sensor for guiding the beam to the single sub-scanning direction beam position/main-scanning direction timing detecting sensor 23 and on the sub-scanning direction beam position/main-scanning direction timing detecting sensor 23 do not become different among the beams with respect to the swinging angle of the polygon mirror body 5a.

The first and second image-forming lenses 30a and 30b have positive power in the sub-scanning direction so that the image surface and the reflection point on the polygon mirror have conjugate relation to prevent the position in the sub-scanning direction in the image surface from being varied due to an influence of the surface-inclination (inclination between angle of each of the reflecting surfaces and an axis passing through a center axis) of each of the reflecting surfaces of the polygon mirror body 5a.

Tables 1 and 2 show optical numeric data of the post deflecting optical system.

TABLE 1

| Post deflecting optical system Curvature | | Absolute coordinates: eccentricity in y-direction-4.333 | | |
|---|---|---|---|---|
| CUY | CUZ | Thickness | Lens surface No. | Material |
| 0.019021 | −0.0147546 | −35.435 | 1 (Incidence plane of lens 30A) | Air |
| 0.02040817 | 0.01793626 | −6.524 | 2 (Ejection plane of lens 30A) | Air |
| 0.0029042340 | −0.00634328 | −106.530 | 3 (Incidence plane of lens 30b) | PMMA |
| 0.002112237 | 0.01552636 | −6.0077405 | 4 (Ejection plane of lens 30A) | Air |
| Plane | Plane | −9.0000 | | |
| Plane | Plane | −2.000 | | BK7 |
| Plane | Plane | −164.000 | | Air |

TABLE 2

Lens surface No. 1 (incidence plane of lens 30a) coefficient

| n/m | 0 | 1 | 2 | 3 | 4 | 5 |
|---|---|---|---|---|---|---|
| 0 | 0.000E+00 | −5.075E-02 | 0.000E+00 | 3.402E-05 | −5.413E-06 | −8.876E-09 |
| 1 | 0.000E+00 | −5.988E-06 | 1.407E-07 | 1.467E-07 | 1.155E-08 | −6.891E-10 |
| 2 | −8.696E-05 | −3.944E-06 | −4.335E-07 | 5.183E-08 | −1.916E-09 | 4.486E-11 |
| 3 | 1.008E-05 | 7.221E-08 | 2.189E-08 | −1.459E-09 | 1.338E-10 | −8.773E-12 |
| 4 | −2.309E-07 | −1.553E-10 | −5.827E-10 | 4.448E-11 | −9.423E-13 | 0.000E+00 |

| n/m | 6 | 7 | 8 | 9 | 10 |
|---|---|---|---|---|---|
| 0 | −3.297E-10 | 3.380E-11 | −5.406E-13 | −1.116E-14 | 7.120E-16 |
| 1 | 6.566E-12 | −5.297E-13 | 1.169E-14 | 5.802E-16 | −1.260E-17 |
| 2 | 3.950E-12 | −2.012E-13 | −4.174E-17 | −3.424E-16 | 1.399E-17 |
| 3 | −1.468E-13 | 1.466E-14 | −1.448E-16 | 2.661E-17 | −9.120E-19 |
| 4 | 0.000E+00 | 0.000E+00 | 0.000E+00 | 0.000E+00 | 0.000E+00 |

Lens surface No. 2 (ejection plane of lens 30a) coefficient

| n/m | 0 | 1 | 2 | 3 | 4 | 5 |
|---|---|---|---|---|---|---|
| 0 | 0.000E+00 | −6.687E-02 | 0.000E+00 | 2.044E-05 | −4.684E-06 | 7.391E-09 |
| 1 | 0.000E+00 | −1.127E-06 | −2.689E-06 | 1.774E-07 | −1.558E-09 | −2.888E-10 |
| 2 | 2.387E-05 | −4.140E-05 | −3.284E-07 | 3.799E-08 | 2.264E-12 | 6.067E-12 |
| 3 | −8.930E-05 | 1.961E-07 | 1.561E-08 | −2.529E-09 | 8.180E-11 | 2.810E-12 |
| 4 | 2.522E-07 | −3.095E-09 | −5.120E-10 | 4.207E-11 | −9.506E-13 | 0.000E+00 |

| n/m | 6 | 7 | 8 | 9 | 10 |
|---|---|---|---|---|---|
| 0 | −9.888E-10 | 1.234E-11 | −2.037E-13 | −9.521E-17 | 2.607E-16 |
| 1 | 2.046E-11 | −7.927E-13 | 5.657E-15 | −3.536E-16 | 1.618E-17 |
| 2 | −2.478E-12 | −6.435E-14 | 3.196E-15 | 1.237E-16 | −3.821E-18 |
| 3 | −2.949E-14 | −6.090E-15 | 6.149E-17 | 4.649E-18 | −6.623E-20 |
| 4 | 0.000E+00 | 0.000E+00 | 0.000E+00 | 0.000E+00 | 0.000E+00 |

Lens surface No. 3 (incidence plane of lens 30b) coefficient

| n/m | 0 | 1 | 2 | 3 | 4 | 5 |
|---|---|---|---|---|---|---|
| 0 | 0.000E+00 | 1.660E-02 | 0.000E+00 | −3.927E-06 | −2.133E-07 | 3.818E-10 |
| 1 | 0.000E+00 | −2.644E-05 | 5.823E-07 | −1.140E-10 | 8.057E-11 | 1.705E-13 |
| 2 | −8.028E-06 | −5.092E-08 | 1.020E-11 | 1.569E-11 | −6.288E-15 | −2.339E-16 |
| 3 | −3.363E-09 | 1.290E-10 | 3.133E-12 | 5.319E-14 | −8.741E-17 | −2.001E-18 |
| 4 | 2.025E-10 | 1.118E-12 | −8.987E-15 | −1.688E-16 | −9.048E-18 | 0.000E+00 |

| n/m | 6 | 7 | 8 | 9 | 10 |
|---|---|---|---|---|---|
| 0 | 1.505E-11 | 2.572E-14 | −8.037E-16 | 1.475E-18 | −1.904E-20 |
| 1 | −1.613E-14 | 7.102E-11 | −8.131E-19 | 3.084E-21 | 1.349E-23 |
| 2 | 1.893E-17 | −6.265E-19 | 1.203E-21 | 3.247E-23 | −1.577E-25 |
| 3 | 1.135E-19 | −3.473E-22 | 6.745E-24 | −4.288E-21 | −5.142E-29 |
| 4 | 0.000E+00 | 0.000E+00 | 0.000E+00 | 0.000E+00 | 0.000E+00 |

Lens surface No. 4 (ejection plane of lens 30b) coefficient

| n/m | 1 | 1 | 2 | 3 | 4 | 5 |
|---|---|---|---|---|---|---|
| 0 | 0.000E+00 | 1.022E-02 | 0.000E+00 | −4.091E-06 | −4.387E-08 | 4.082E-10 |
| 1 | 0.000E+00 | −1.972E-05 | 3.253E-07 | −1.081E-03 | 2.945E-11 | 2.841E-13 |
| 2 | −8.691E-06 | −5.126E-08 | 2.922E-10 | 1.530E-11 | −1.618E-15 | −1.539E-15 |
| 3 | −8.160E-09 | 4.185E-11 | 1.989E-12 | 4.893E-14 | 2.992E-16 | 2.713E-18 |
| 4 | 1.658E-10 | 1.372E-12 | −3.279E-15 | −1.813E-16 | −7.667E-18 | 0.000E+00 |

| n/m | 6 | 7 | 8 | 9 | 10 |
|---|---|---|---|---|---|
| 0 | 1.591E-12 | 9.148E-18 | 2.739E-16 | 4.265E-18 | −7.011E-20 |
| 1 | −9.708E-16 | 1.800E-17 | −1.643E-18 | 1.058E-20 | −3.151E-23 |
| 2 | −3.743E-18 | −6.221E-20 | 2.589E-21 | −1.455E-23 | −9.009E-26 |
| 3 | 7.095E-20 | −6.659E-22 | −5.008E-24 | −4.140E-26 | 1.614E-27 |
| 4 | 0.000E+00 | 0.000E+00 | 0.000E+00 | 0.000E+00 | 0.000E+00 |

The lens shape of the post deflecting optical system shown in Tables 1 and 2 is expressed by the following equation (1);

$$X = (cuy \times y^2 + cuz \times z^2)/(1 + \sqrt{1 - cuy^2 \times y^2 - cuz^2 \times z^2}) + a_{mn} x y^m z^{(2n)} \quad (1).$$

If an imaging lens set 30 that has two image-forming lenses 30a and 30b are included in the post deflecting optical system 21 under a condition that intervals between the plurality of beams are maintained constantly in all the scanning regions, wave aberration can not be corrected with a conventional toric lens or symmetry rotation aspheric surface having symmetry axis of rotation, and the image surface beam diameter can not be stopped down to 100 µm or smaller. This fact was found by simulation and therefore, the lens of the post deflecting optical system shown in tables 1 and 2 has the above-described shape.

Since lens surfaces (incident surface of 30a, incident surface of 30b, leaving surface of 30a and leaving surface of 30b) of each of the two image-forming (the imaging lens set 30) are formed into the shape having no symmetry axis of rotation, it is possible to stop down the image surface beam diameter to about 50 µm while constantly maintaining the intervals between the plurality of beams in all the scanning regions.

If specifications of various elements of the post deflecting optical system 21 are formed in accordance with the data shown in Tables 1 and 2, it is possible to suppress the beam positional deviation on the image surface down to 4 µm even if the reflecting surface of the polygonal mirror unit 5 is inclined through one minute.

That is, this optical scanning device has a function to correct an undesirable characteristic (surface inclination) which is given when each of the reflecting surfaces of the polygon mirror body 5a of the polygonal mirror unit 5 is inclined with respect to the rotation axis, and the correcting magnification is 1/48 times.

When the optical scanning device does not have the surface-inclination correcting function, if the surface inclination is continued for more than two seconds, jitter component is adversely sensed on the image and thus, the polygon mirror body 5a becomes extremely expensive.

Next, the forwardly deflecting optical system 7 between the laser element as a light source and the polygonal mirror unit 5 will be explained in detail.

The optical scanning device 1 includes two, i.e., first and second laser elements for radiating light beams guided by the photoreceptors 58 (Y, M, C and B), and first to fourth light sources 3 (Y, M, C and B) generating laser beams corresponding to image data separated into three primary colors of light.

The first to fourth light sources 3 (Y, M, C and B) respectively include a first yellow laser 3Ya and a second yellow laser 3Yb for radiating laser beams corresponding to Y, i.e., yellow image; a first magenta laser 3Ma and a second magenta laser 3Mb for radiating laser beams corresponding to M, i.e., magenta image; a first cyan laser 3Ca and a second cyan laser 3Cb for radiating laser beams corresponding to C, i.e., cyan image; and a first black laser 3Ba and a second black laser 3Bb for radiating laser beams corresponding to B, i.e., black image. The laser beams from the light sources 3 (Y, M, C and B) are gathered together to such a degree that the laser beams can be handled together with laser beams from the mating laser element as one beam.

Four sets of forwardly deflecting optical system 7 (Y, M, C and B) are respectively disposed between the laser elements 3Ya, 3Ma, 3Ca, 3Ba and the polygonal mirror unit 5 for forming sectional beam spot shapes of the laser beams LYa, LMa, LCa and LBa from the laser elements 3Ya, 3Ma, 3Ca and 3Ba into predetermined shapes.

Figure 4:
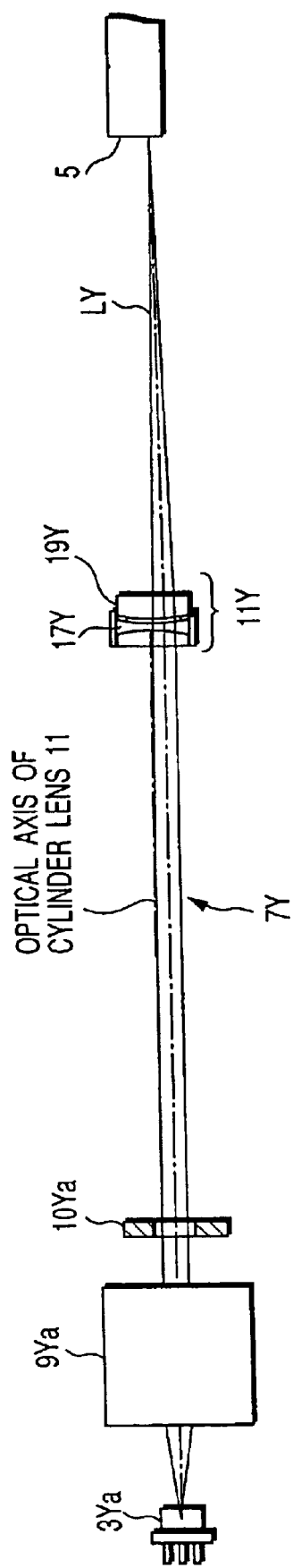
FIG. 4 is a sectional view showing a state in which one beam of a forwardly deflecting optical system of the optical scanning device shown in FIG. 2 passes.

Here, the forwardly deflecting optical system 7Y will be explained as a representative of laser beam 3Ya ejected from the first yellow laser 3Ya to the polygonal mirror unit 5, as shown in FIG. 4.

An emanative laser beam LYa ejected from the first yellow laser 3Ya is converged to a predetermined value by a finite focal lens 9Ya and then, the sectional beam shape is shaped into a predetermined form by an aperture 10Ya.

The laser beam LYa which had passed the aperture 10Ya is further converged to a predetermined value only in the sub-scanning direction by a hybrid lens 11Y and guided to the polygonal mirror unit 5.

A half mirror 12Y is inserted in between the finite focal lens 9Ya and the hybrid lens 11Y at a predetermined angle with respective to an optical axis between the infinite focal lens 9Ya and the hybrid lens 11Y.

On a surface opposite from a surface which the laser beam Lya enters from the first yellow laser 3Ya on the half mirror 12Y, a laser beam Lyb from the second yellows laser 3Yb disposed such that a predetermined beam distance can be provided in the sub-scanning direction with respect to the laser beam Lya from the first yellow laser 3Ya enters at a predetermined beam distance in the sub-scanning direction with respect to the laser beam Lya from the first yellow laser 3Ya. A finite local lens 9Yb and an aperture 10Yb are disposed between the second yellow laser 3Yb and the half mirror 12Y for converging the laser beam Lyb from the second yellow laser 3Yb to a predetermined value.

The laser beams LYa and LYb combined into substantially one laser beam having a predetermined beam distance in the sub-scanning direction by the half mirror 12Y pass through laser combining mirrors 13M, 13C and 13B, and guided to the polygonal mirror unit 5. M, C and B also have the same structure.

As the finite focal lenses 9 (Y, M, C and B) a and 9 (Y, M, C and B) b, an aspherical glass lens or a single lens comprising an aspherical glass lens and UV cure plastic aspheric lens laminated on the aspherical glass lens can be utilized.

As shown in FIG. 4, the hybrid lens 11Y is formed with a PMMA lens 17Y and a glass cylinder lens 19Y. The hybrid lens 11Y has a structure in which the lens 17Y and the cylinder lens 19Y has an air layer between the leaving surface of the lens 17Y and the cylinder lens 19Y, and a portion of the lens through which light does not pass is provided with a portion in which both the lenses are in contact with each other, shown In FIG. 5.

The post deflecting optical system 21 including the imaging lens set has the positive power in the sub-scanning direction, and if a temperature rises, index of refraction is reduced and the lens is expanded and thus, the power (symbol is + (plus)) is reduced.

In order to maintain the beam gathering position constantly on the image surface, it is necessary to bring a subject away from the lens of the post deflecting optical system when a temperature rises.

In order to provide the forwardly deflecting optical system 7 with such a function, if the lens is made of material similar to plastic material used in the post deflecting optical system 21, and a lens having negative power in the sub-scanning direction is used, the lens power (symbol is − (minus)) is reduced in index of refraction if a temperature rises and the lens is expanded and thus, the absolute value of the power is reduced.

For this reason, the power is increased, and the above-described condition (subject is moved away from the lens of the post deflecting optical system) can be satisfied.

Further, the plastic lens 17Y is disposed on the side of a surface having a curvature of the glass lens 19Y, a member which comes into contact with a portion having the curvature of the glass lens 19Y to maintain the distance constant is provided. With this structure, an automatic centering function by a cylindrical portion of the glass lens and the plastic lens having the member spreading in tangent direction can be achieved.

That is, parallelism of the plane of symmetry and the bus can be maintained.

Figure 5:
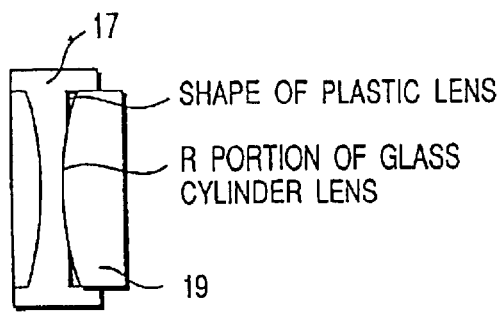
FIG. 5 is a schematic view showing one example of one of hybrid lens structures through which laser beams of the forwardly deflecting optical system of the optical scanning device shown in FIG. 2 pass.

However, if the air layer is inserted as shown in FIG. 5, a region which is in contact with the glass lens and has the glass shape and a region having the original plastic lens shape are generated in a region through which the light of plastic passes as shown in FIG. 5. If there is a slight deviation in shape of both the surfaces, the focus position is deviated between the region having the glass shape and the region of the plastic lens, which makes it difficult to obtain optical beam shape at one location. The first embodiment has a structure for solving the above problem, as shown in FIG. 6.

Figure 6:
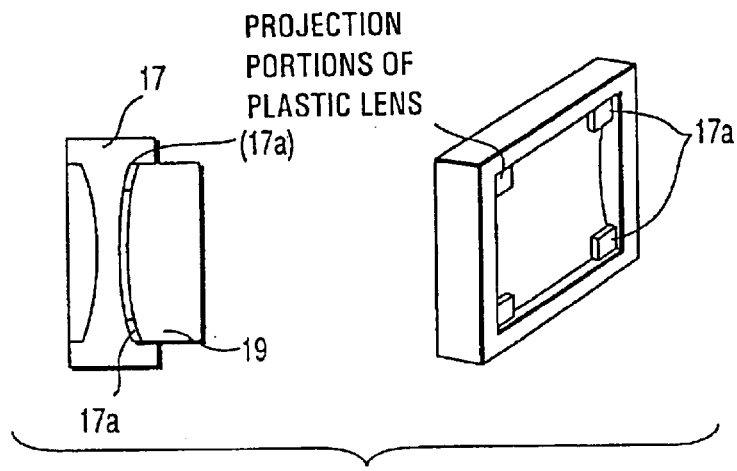
FIG. 6 is a schematic view for explaining one of hybrid lenses through which laser beams of the forwardly deflecting optical system of optical scanning device shown in FIG. 2 pass, respectively.

As shown in FIG. 6, the plastic lens 17 is made of material such as PMMA (polymethyl methacrylate). The glass cylinder lens 19 is made of material such as SF6.

When the plastic lens 17 of the hybrid cylinder lens 11 has a surface of negative power in the sub-scanning direction, and the plastic lens 17 and the glass cylinder lens 19 are assembled, a space portion is formed while sandwiching one convex surface of the glass cylinder lens 19, and the plastic lens 17 has at least two of the projection portions 17a abutting in the convex surface.

With this structure, in order to provide the automatic centering function for correcting the inclination of the two lenses in the region through which beams do not pass, the convex portion of the glass lens and a plastic surface having a portion of a surface in the tangent direction are connected to each other. Further, the glass and the plastic lens are set glass lens and a plastic surface having a portion of a surface in the tangent direction are connected to each other. Further, the glass and the plastic lens are set such that they do not come into contact with each other in a position where the beam passes.

With this structure, the automatic centering function is utilized, parallelism of the plane of symmetry and the bus is maintained, and even if the shapes of the plastic lenses are deviated, the curvature is prevented from being varied abruptly, and the flare in the image surface and the increase of the beam diameter can be prevented.

Figure 7:
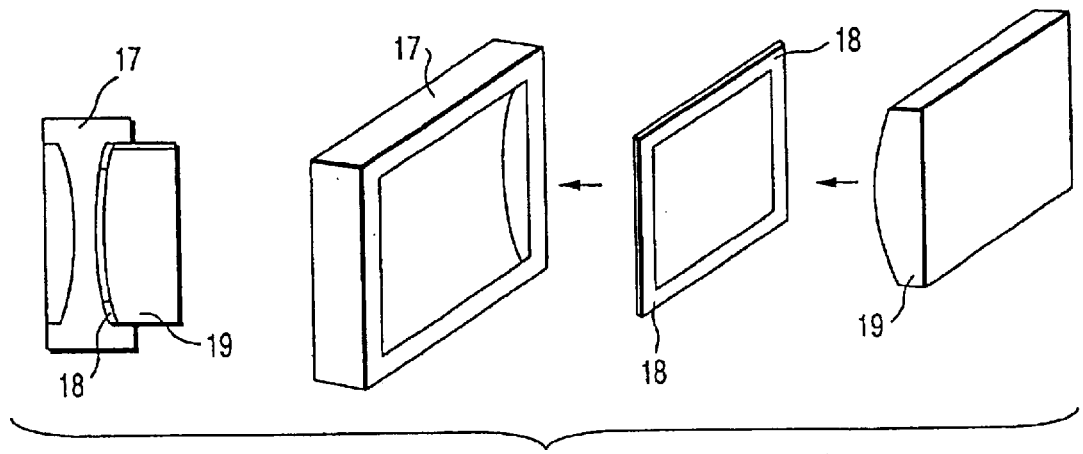
FIG. 7 is a schematic view for explaining one of hybrid lenses through which laser beams of the forwardly deflecting optical system of the optical scanning device shown in FIG. 2 pass, respectively.

FIG. 7 is for explaining another embodiment of the optical scanning device of the present invention. The hybrid cylinder lens 11 has a includes a one side convex glass cylinder having curvature of substantially the same absolute value as that of the resin lens having negative power surface and having positive power in the sub-scanning direction. The resin lens and the glass cylinder lens have a space portion sandwiching the one side convex surface, and have a substantially constant thickness therebetween, and a deformable sheet is inserted.

In the example shown in FIG. 7, a Mylar sheet which is a plastic sheet 18 having 0.05 mm thickness is sandwiched.

In this case, it is preferable that the connected surfaces of the glass lens and the plastic lens have the same curvature, but slight difference can be accepted. With structure, the same effect as that of the first embodiment shown in FIG. 5 can be obtained.

Tables 4A and 4B are for explaining a third embodiment, and show parameters explaining the lens shape.

TABLE 3A

Cylinder lens coefficient

| Thickness | Curvature in main-scanning direction | Curvature in sub-scanning direction | Material |
|---|---|---|---|
| 1.5 | 0 | −0.002426985 | PMMA |
| 0 | 0 | 0.048259651 | Air |
| 5 | 0 | 0.048259651 | SF6 |
| | 0 | 0 | |

TABLE 3B

Free-form surface of PMMA lens (plastic lens)

| n/m | 1 | 2 | 3 | 4 | 5 |
|---|---|---|---|---|---|
| 1 | 0 | 0 | 0 | 0 | 0 |
| 2 | 0 | 0 | 0 | 0 | 0 |
| 3 | 0 | 0 | 0 | 0 | 0 |

TABLE 4A

Aspheric coefficient in sub-scanning direction

| Thickness | Curvature in man-scanning direction | Curvature in sub-scanning direction | Material | Note |
|---|---|---|---|---|
| 1.5 | 0 | −0.003973344 | PMMA | Free-form surface |
| 0.05 | 0 | 0.048259651 | Air | |
| 5 | 0 | 0.048259651 | SF6 | |
| | 0 | 0 | | |

TABLE 4B

Free-form surface of PMMA lens (plastic lens)

| n/m | 0 | 1 | 2 | 3 | 4 |
|---|---|---|---|---|---|
| 0 | 0.00E+00 | 0.00E+00 | 0.00E+00 | 0.00E+00 | 0.00E+00 |
| 1 | 5.56E−04 | 0.00E+00 | 0.00E+00 | 0.00E+00 | 0.00E+00 |
| 2 | 1.07E−06 | 0.00E+00 | 0.00E+00 | 0.00E+00 | 0.00E+00 |
| 3 | −2.71E−07 | 0.00E+00 | 0.00E+00 | 0.00E+00 | 0.00E+00 |
| 4 | 1.18E−08 | 0.00E+00 | 0.00E+00 | 0.00E+00 | 0.00E+00 |

In Tables 4, the incident surface shape of the plastic lens 17Y is the same as the equation (1) showing the shape of the post deflecting optical system. For comparison, numerical data of the conventional example is shown in Tables 3 and FIGS. 8 to 13. FIGS. 14 to 19 show the RMS-OPD of the lens having a shape shown in Tables 4, OPD(p-v), beam diameter in the main-scanning direction, beam diameter in the sub-scanning direction, flare amount in the main-scanning direction, and flare amount in the sub-scanning direction. In each of the drawings, a curve a (solid line) shows performance when ambient temperature is 20° C., a curve b (dotted line) shows performance when ambient temperature is 50° C., and a curve c (chain line) shows performance when ambient temperature is −10° C. Lateral axes show position in the main-scanning direction in the image surface.

In the case of the conventional hybrid lens, since the radius of curvature is constant along the sub-scanning direction, in order to cancel the spherical aberration and the coma aberration as the entire hybrid lens by the spherical aberration and the coma aberration generated in the post deflecting optical system 21, it is difficult to set-the aberrations to predetermined values.

This deteriorates the RMS-OPD in the image surface, and the flare in the sub-scanning direction is increased.

To solve this problem, the plastic cylinder lens of the conventional hybrid lens is replaced by a resin lens having surface whose radius of curvature of the sub-scanning direction is varied in the sub-scanning direction.

That is, it is possible to optimize the radius of curvature in the sub-scanning direction depending upon locations by providing the coefficient portion of n=2 with a component other than "0" in the "$a_{mn} x^m y^{(2n)}$" of the equation (1) in Table 4.

In each of the drawings, a curve a (solid line) shows performance when ambient temperature is 20° C., a curve b (dotted line) shows performance when ambient temperature is 50° C., and a curve c (chain line) shows performance when ambient temperature is -10° C. Lateral axes show position in the main-scanning direction in the image surface.

Figure 8:
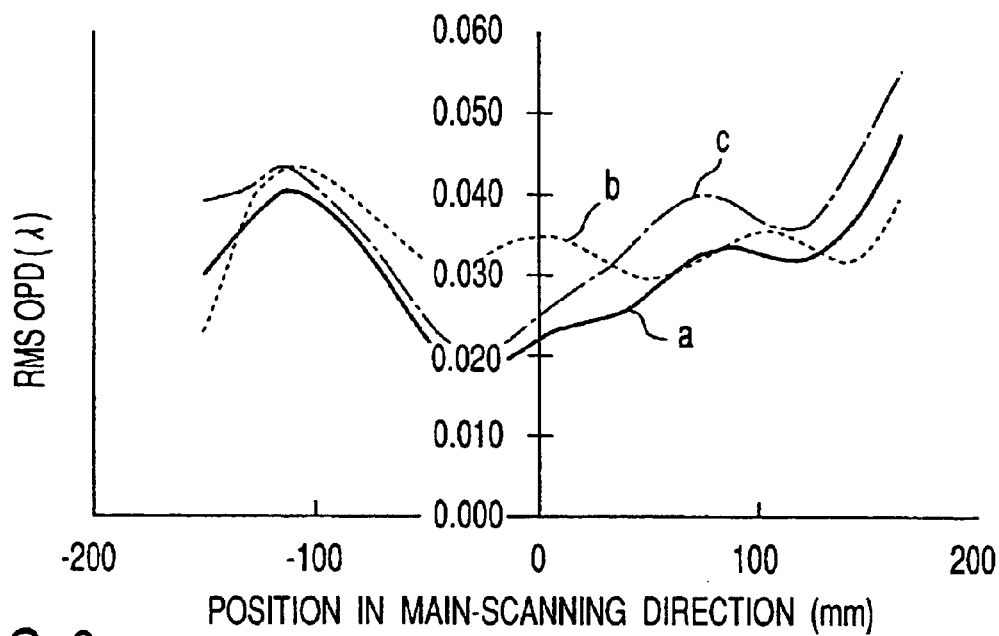
FIG. 8 is a graph showing RMS-OPD in a known optical scanning device.
Figure 9:
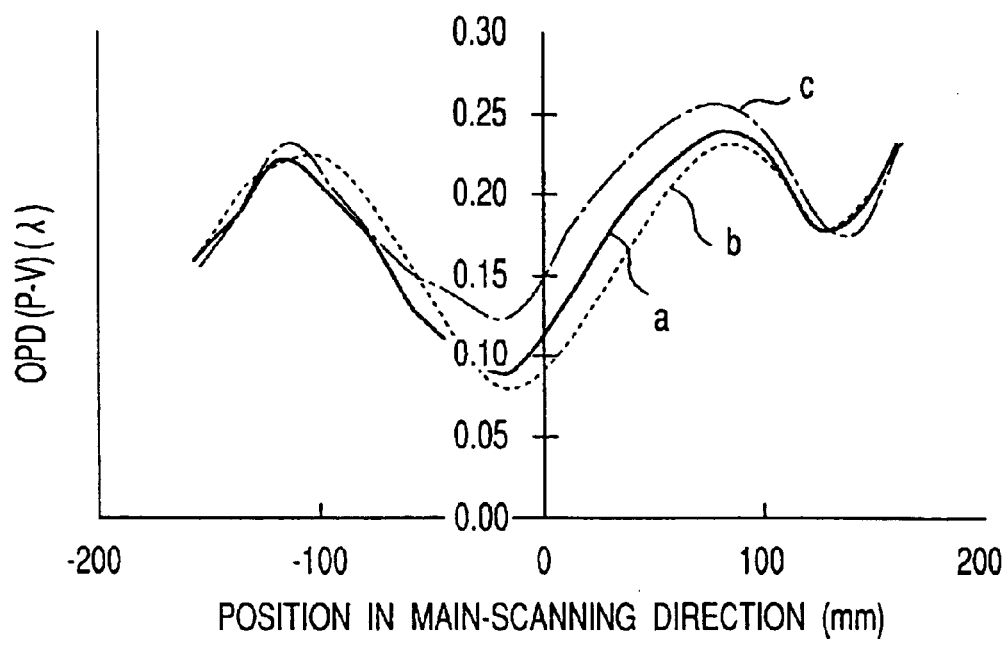
FIG. 9 is a graph showing OPD (p-v) in the known optical scanning device.
Figure 10:
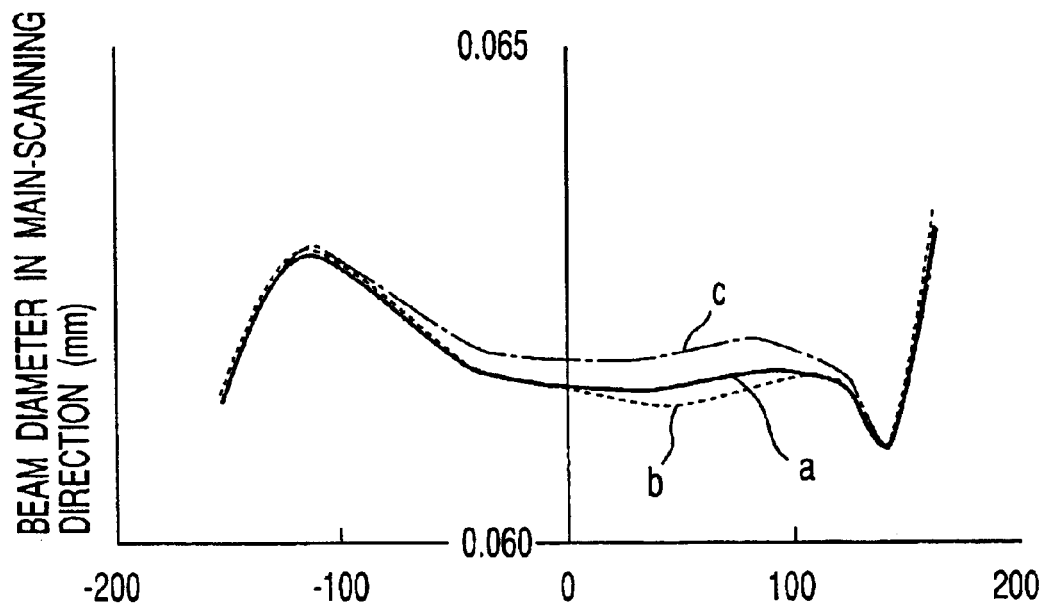
FIG. 10 is a graph showing a beam diameter in a main-scanning direction of the known optical scanning device.
Figure 11:
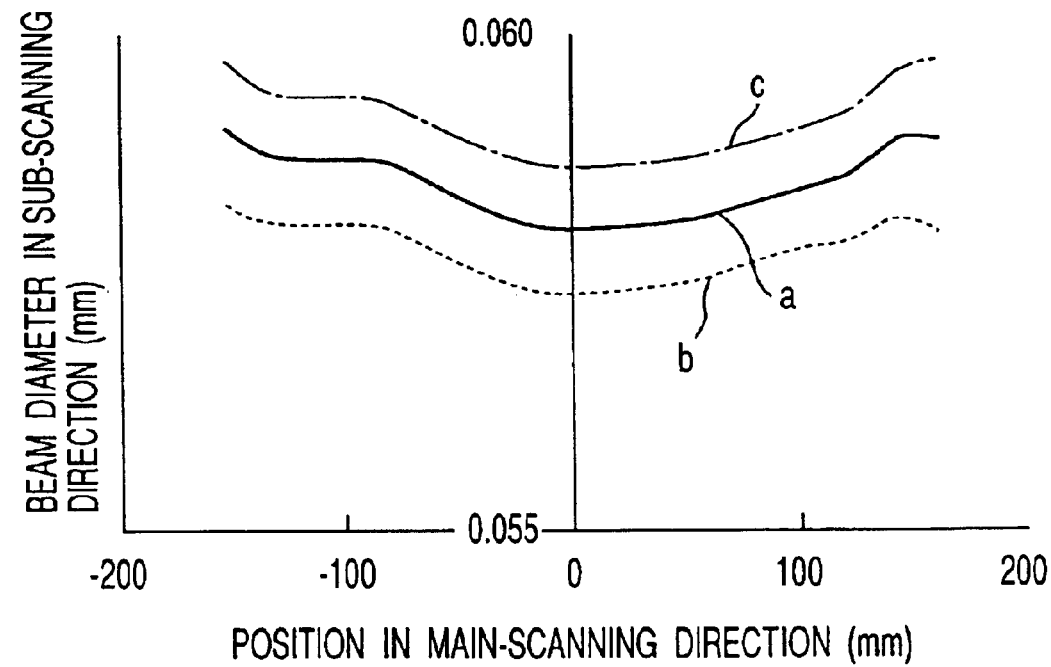
FIG. 11 is a graph showing the beam diameter in a sub-scanning direction of the known optical scanning device.

From the comparison (RMS-OPD) between FIG. 8 and FIG. 4, improvement can be found in the vicinity of the central portion of the RMS-OPD as compared with the conventional technique.

Figure 12:
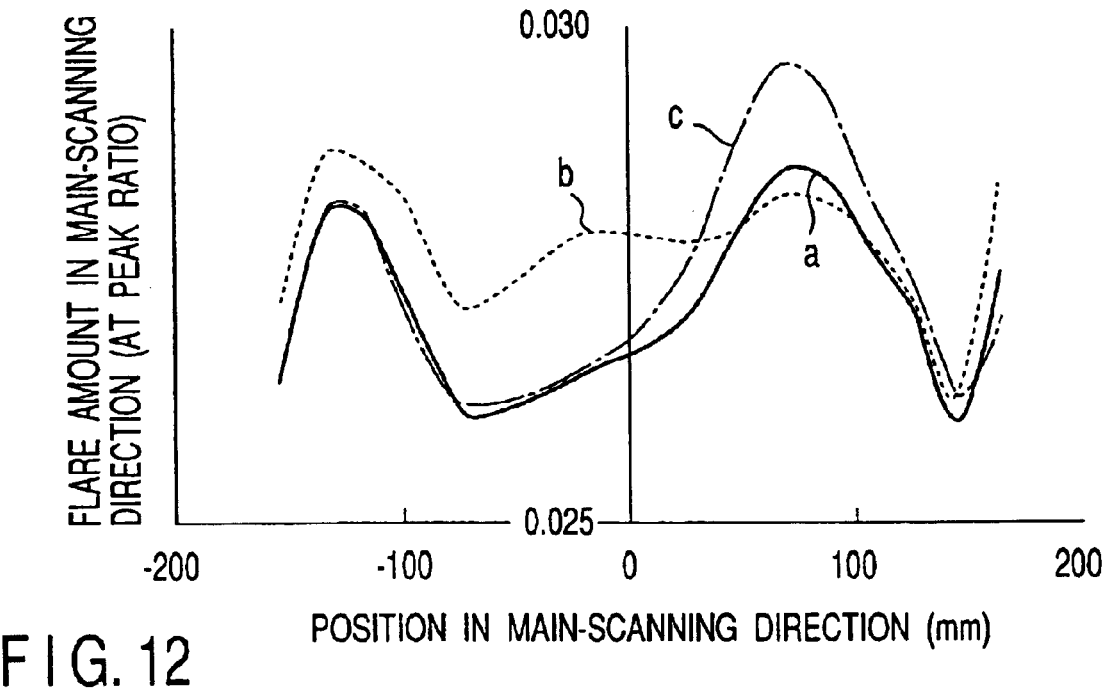
FIG. 12 is a graph showing a flare amount in the main-scanning direction of the known optical scanning device.
Figure 18:
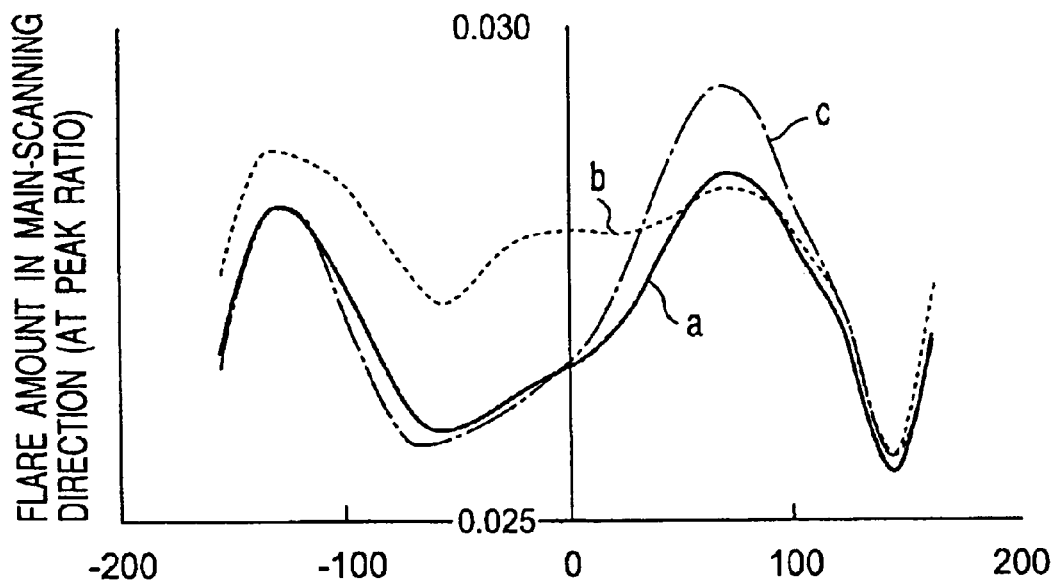
FIG. 18 is a graph showing a flare amount in the main-scanning direction of the optical scanning device of the third embodiment.
Figure 19:
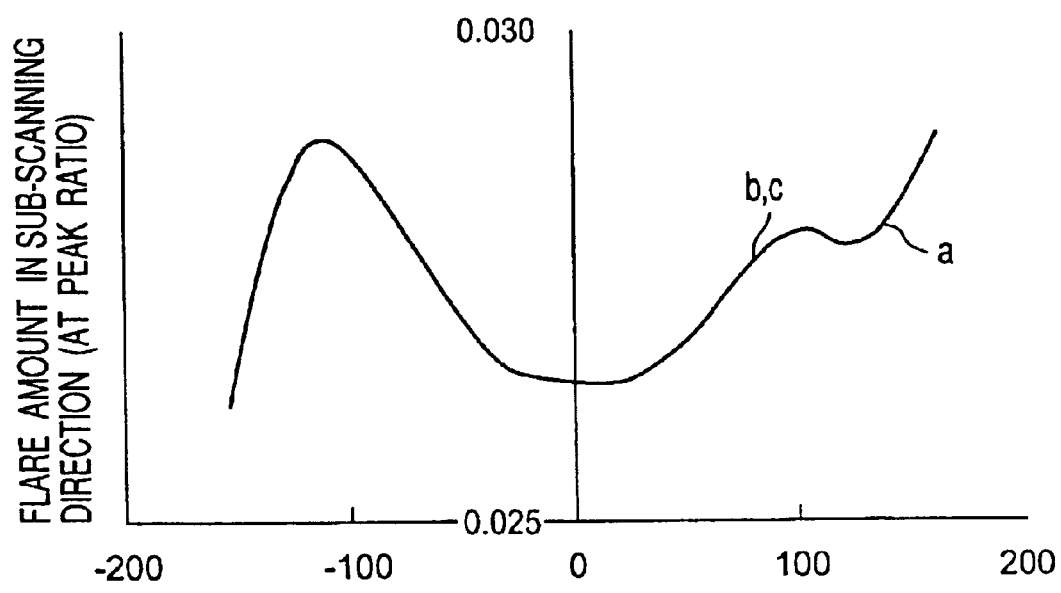
FIG. 19 is a graph showing the flare amount in the sub-scanning direction of the optical scanning device of the third embodiment.
Figure 24:
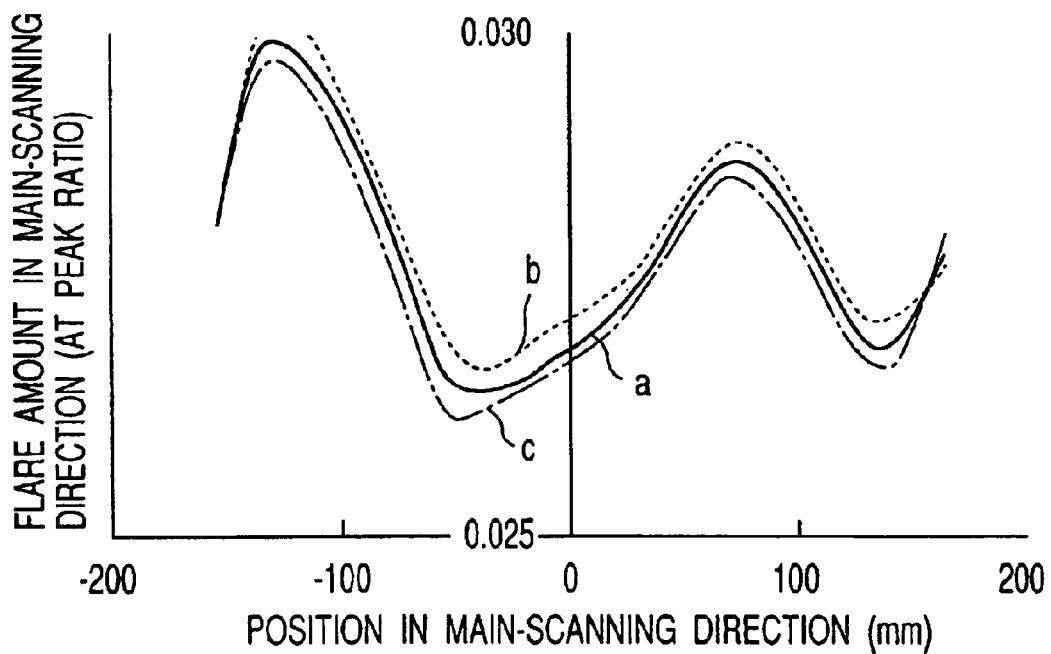
FIG. 24 is a graph showing a flare amount in the main-scanning direction of the optical scanning device of the fourth embodiment.
Figure 25:
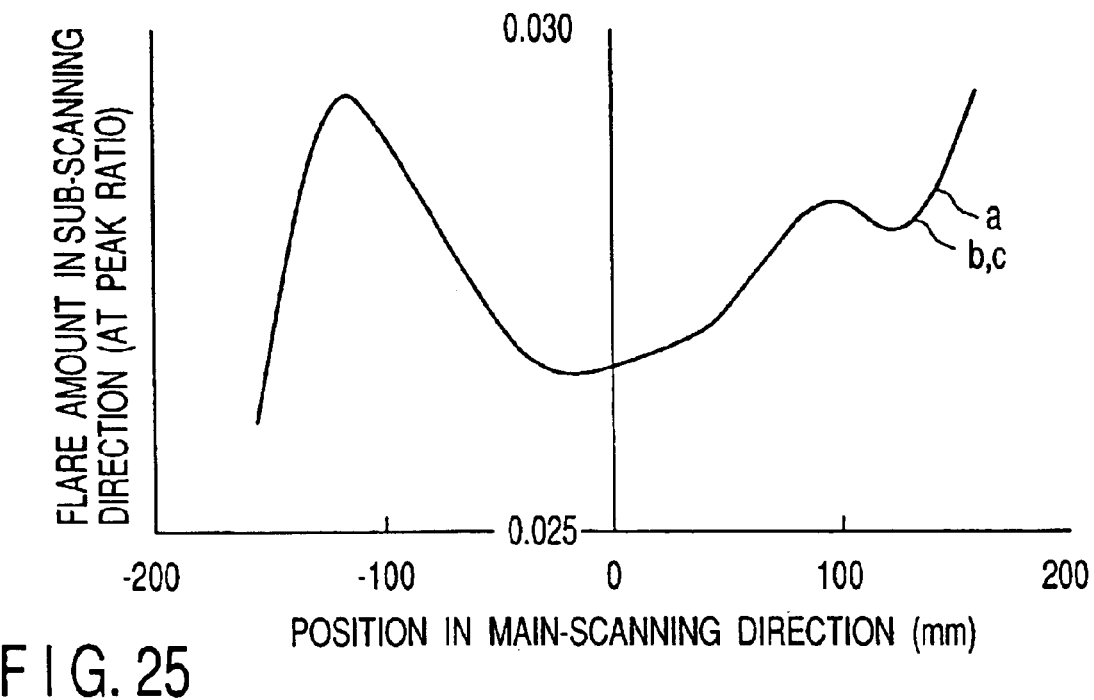
FIG. 25 is a graph showing the flare amount in the sub-scanning direction of the optical scanning device of the fourth embodiment.

From the comparison (flare amount in the sub-scanning direction) between FIG. 12 and FIG. 18, it can be confirmed that the flare amount in the sub-scanning direction is reduced in the vicinity of the central portion.

Table 5 shows data for explaining another embodiment (corresponding to claims 2 and 3) of the lens shape, and shows that if the lens is formed in accordance with the data shown in Table 5, it is possible, as shown in FIGS. 20 to 25, to improve the RMS-OPD (FIG. 20), the OPD (p-v) (FIG. 21), the beam diameter in the main-scanning direction (FIG. 22), the beam diameter in the sub-scanning direction (FIG. 23), the flare amount in the main-scanning direction (FIG. 24) and the flare amount in the sub-scanning direction (FIG. 25), as compared with the examples shown in FIGS. 8 to 13. In each of the drawings, a curve a (solid line) shows performance when ambient temperature is 20° C., a curve b (dotted line) shows performance when ambient temperature is 50° C., and a curve c (chain line) shows performance when ambient temperature is -10° C. Lateral axes show position in the main-scanning direction in the image surface. In this embodiment, it is confirmed that the variations in the RMS-OPD, OPD (p-v), the beam diameter in the main-scanning direction and the flare amount in the main-scanning direction due to an ambient temperature are reduced.

TABLE 5A

Aspheric coefficient in main-/sub-scanning direction

| Thickness | Curvature in man-scanning direction | Curvature in sub-scanning direction | Material | Note |
|---|---|---|---|---|
| 1.5 | -3.72E-04 | -0.003910705 | PMMA | Free-form surface |
| 0.05 | 0.00E+00 | 0.048259651 | Air | |
| 5 | 0.00E+00 | 0.048259651 | SF6 | |
| | 0.00E+00 | 0 | | |

TABLE 5B

Free-form surface of PMMA lens (plastic lens)

| n/m | 0 | 1 | 2 | 3 | 4 |
|---|---|---|---|---|---|
| 0 | 0.00E+00 | -3.75E-04 | -2.27E-04 | -2.21E-07 | -5.15E-07 |
| 1 | 3.27E-04 | -8.27E-07 | 1.08E-06 | 5.04E-08 | -7.74E-08 |
| 2 | 5.89E-07 | 1.26E-07 | -1.72E-07 | 4.56E-09 | 2.06E-08 |
| 3 | -2.32E-07 | 7.45E-10 | 9.33E-09 | -2.95E-09 | -8.78E-10 |
| 4 | 1.07E-08 | -3.40E-10 | 3.04E-10 | 1.81E-10 | -4.48E-11 |

Table 6 shows data for explaining another embodiment of the lens shape, and shows that if the lens is formed in accordance with the data shown in Table 6, it is possible, as shown in FIGS. 26 to 31, to improve the RMS-OPD (FIG. 26), the OPD (p-v) (FIG. 27), the beam diameter in the main-scanning direction (FIG. 28), the beam diameter in the sub-scanning direction (FIG. 29), the flare amount in the main-scanning direction (FIG. 30) and the flare amount in the sub-scanning direction (FIG. 31), as compared with the examples shown in FIGS. 8 to 13. In each of the drawings, a curve a (solid line) shows performance when ambient temperature is 20° C., a curve b (dotted line) shows performance when ambient temperature is -50° C., and a curve c (chain line) shows performance when ambient temperature is -10° C. Lateral axes show position in the main-scanning direction in the image surface.

TABLE 6A

Aspheric coefficient in main-/sub-scanning direction with a curvature of glass lens is not equal

| Thickness | Curvature in main-scanning direction | Curvature in sub-scanning direction | Material | Note |
|---|---|---|---|---|
| 1.5 | 0 | -0.003911252 | PMMA | Free-form surface |
| | -3.72E-04 | | | |
| 0.05 | 0.00E+00 | 0.048260174 | Air | |
| 5 | 0.00E+00 | 0.048259547 | SF6 | |
| | 0.00E+00 | 0 | | |

TABLE 6B

Free-form surface of PMMA lens (plastic lens)

| n/m | 0 | 1 | 2 | 3 | 4 |
|---|---|---|---|---|---|
| 0 | 0.00E+00 | -4.34E-04 | -2.27E-04 | -2.15E-07 | -5.17E-07 |
| 1 | 3.27E-04 | -8.09E-07 | 1.09E-06 | 4.774E-08 | -7.77E-08 |
| 2 | 6.31E-07 | 1.28E-07 | -1.73E-07 | 4.61E-09 | 2.05E-08 |
| 3 | -2.34E-07 | 5.86E-10 | 9.23E-09 | -2.94E-09 | -8.73E-10 |
| 4 | 1.07E-08 | -3.61E-10 | 3.00E-10 | 1.82E-10 | -4.32E-11 |

As described above, according to the optical scanning device of the embodiment of the present invention, in the hybrid cylinder lens comprising the plastic lens and the glass lens capable of correcting the surface-inclination, it is possible to bring the radius of curvature of the plastic lens surface close to a predetermined value by varying the radius of curvature by the height in the sub-scanning direction to cancel the spherical aberration and the coma aberration as the entire hybrid lens by the spherical aberration and the coma aberration generated in the post deflecting optical system, and it is possible to improved the RMS-OPD in the image surface and to reduce the flare in the sub-scanning direction.

That is, the conventional plastic cylinder lens of the hybrid lens is replaced by the resin lens having a surface having power in the main-scanning direction. In the embodiment, the curvature of one surface in the main-scanning direction in Table 5 is "−", this provides the lens with negative power in the main-scanning direction, thereby canceling the variation of the image-forming position which is caused by temperature variation with respect to the positive power of the post deflecting optical system in the main-scanning direction.

Further, it is possible to reduce the necessity for controlling the lens-holding position for initially gathering or bringing the light from the laser element into parallelism with each other with respect to characteristic thereof against the temperature and moisture variation of the post deflecting optical system, and it is possible to optimize the lens only in terms of the performance the cost. Furthermore, it is possible to provide a power to cancel the deviation in focus position which is caused due to the temperature and moisture variation in the main-scanning direction generated in the post deflecting optical system, and to suppress the deviation of the focus due to the temperature and moisture variation as total.

Further, since the conventional plastic cylinder lens of the hybrid lens is replaced by the resin lens having a surface whose radius of curvature in the main-scanning direction can be varied along the main-scanning direction, it is possible to positively provide aberration in a direction into which the spherical aberration generated in the post deflecting optical system is canceled, and to improve the RMS-OPD in the image surface and reduce the flare and beam diameter in the main-scanning direction. In the embodiment, this corresponds to the term "$a_{mn} \times y^m z^{(2n)}$" of the equation (1), and it is possible to optimize the radius of curvature in the sub-scanning direction depending upon locations by providing the coefficient portion of n=2 with a component other than "0".

In the embodiment, if both the m and n are other than "0", the coefficient is also other than "0". Therefore, the main-scanning curvature and sub-scanning curvature are optimized with respect to the sub-scanning direction, and the main-scanning curvature and sub-scanning curvature are optimized with respect to the main-scanning direction.

That is, if FIG. 8 and FIG. 20 are compared with each other, it is found that the entire RMS-OPD is improved as compared with the conventional example. It is found from FIGS. 13 and 25 that the amount of flare in the sub-scanning direction is reduced in the vicinity of the center. In addition, if FIGS. 10, 22 and FIGS. 12, 24 are compared with each other, it is found that the beam diameter in the main-scanning direction and the temperature dependence of the flare amount are also reduced. This is because that the variation of the image-forming point caused by the temperature variation in the main-scanning direction among the temperature dependency of fθ lens, infinite lens and holding member is suppressed by providing the plastic lens 17Y with the power in the main-scanning direction.

Further, the conventional plastic cylinder lens of the hybrid lens is replaced by the resin lens having a holding surface portion which is contact with the convex surface side of the glass lens provided in the region through which the light does not pass, and having, at the convex surface of the glass lens in the region through which the light passes, the surface of a curvature different from that of the convex surface of the glass. Therefore, in the embodiment, the fact that a curvature of two surfaces and a curvature of three surface of the curvature in the sub-scanning direction of the Table 6 are different indicates this.

With this structure, since the curvature of the glass cylinder lens and the curvature of the plastic lens can be set independently, it is possible to further optimize the coma aberration, the spherical aberration and the characteristics of the post deflecting optical system in the direction to which they are canceled.

Figure 13:
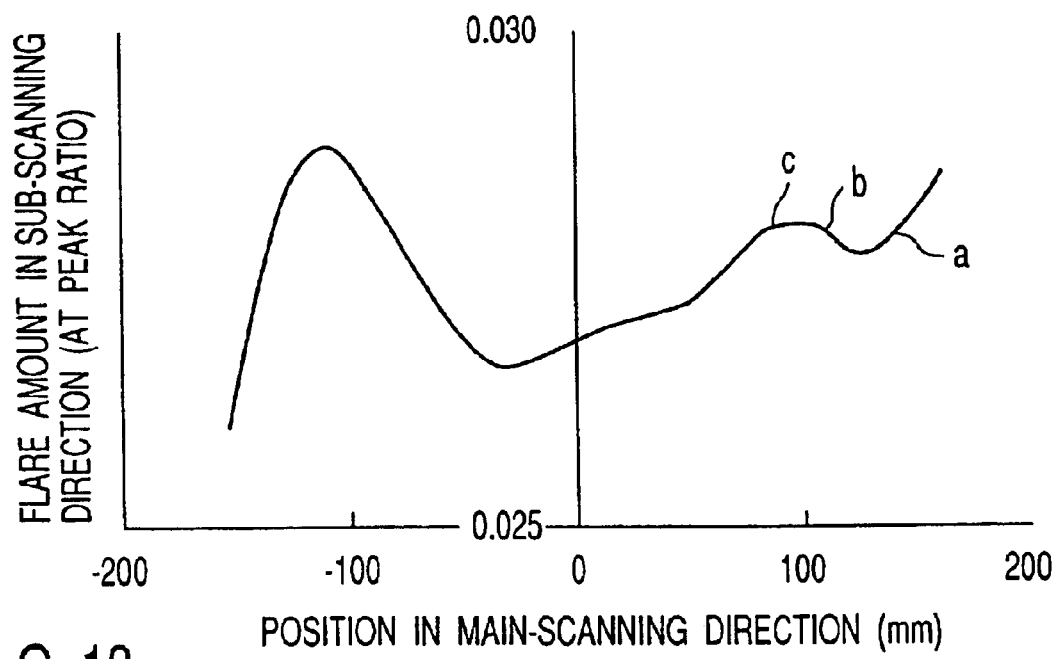
FIG. 13 is a graph showing the flare amount in the sub-scanning direction of the known optical scanning device.
Figure 14:
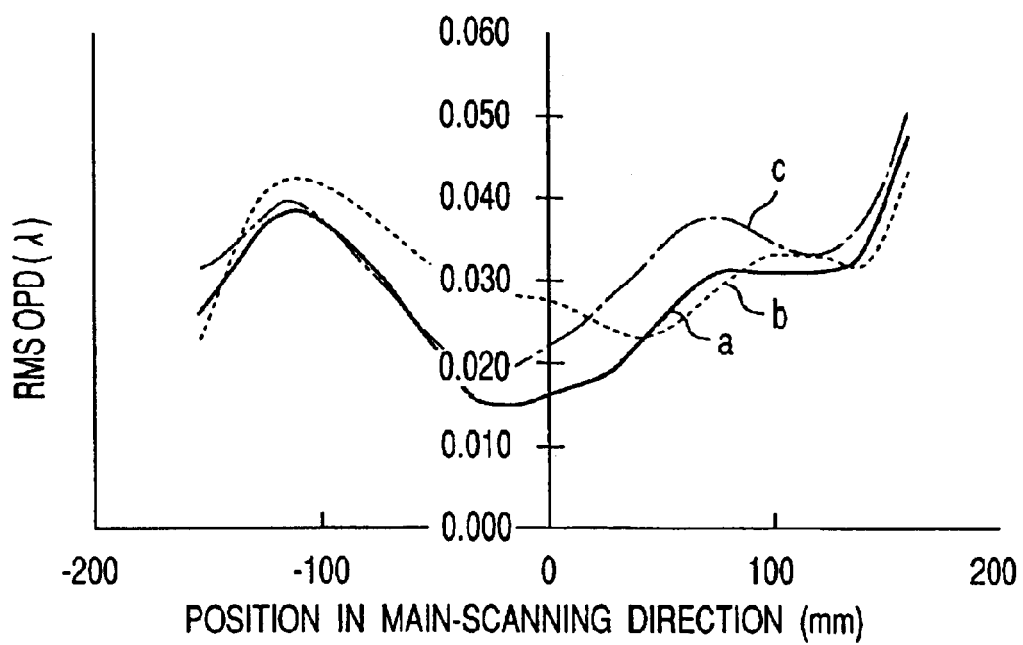
FIG. 14 is a graph showing RMS-OPD in an optical scanning device of a third embodiment.
Figure 15:
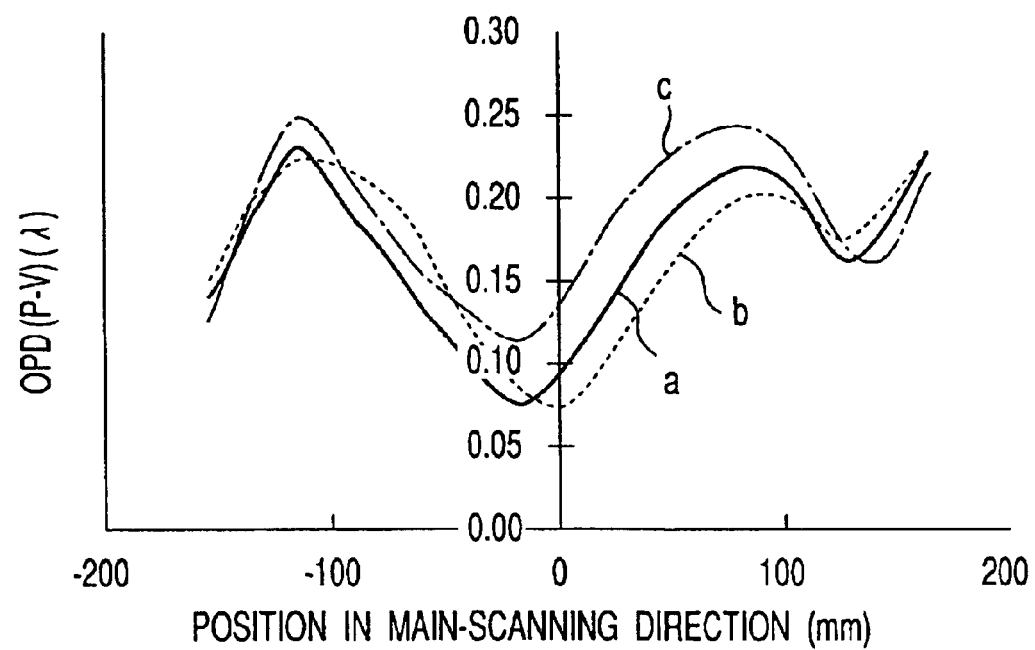
FIG. 15 is a graph showing OPD (p-v) in the optical scanning device of the third embodiment.
Figure 26:
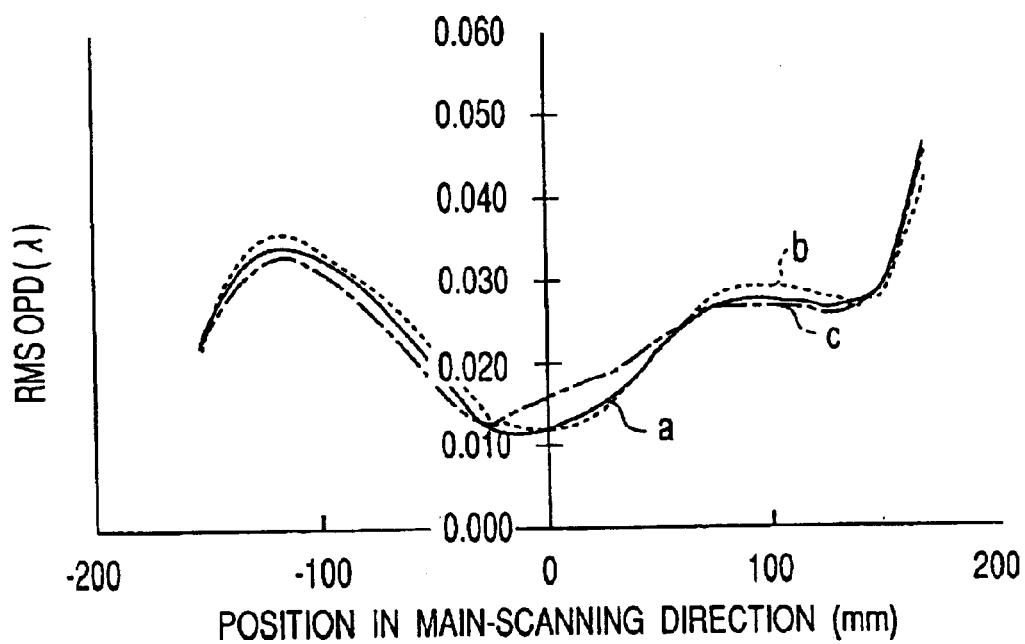
FIG. 26 is a graph showing RMS-OPD in an optical scanning device of a fifth embodiment.
Figure 27:
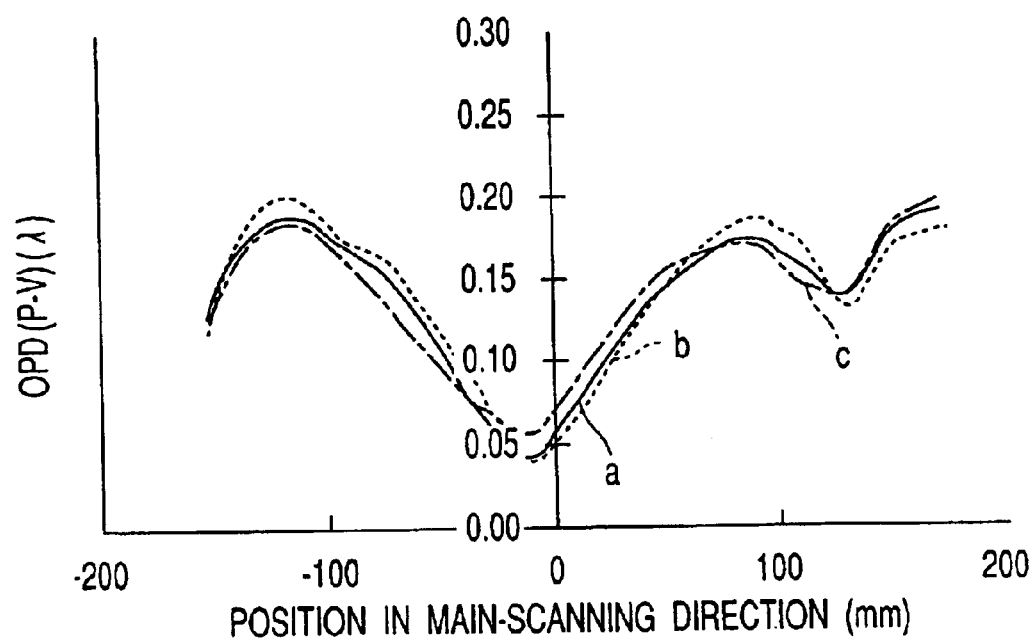
FIG. 27 is a graph showing OPD (p-v) in the optical scanning device of the fifth embodiment.
Figure 28:
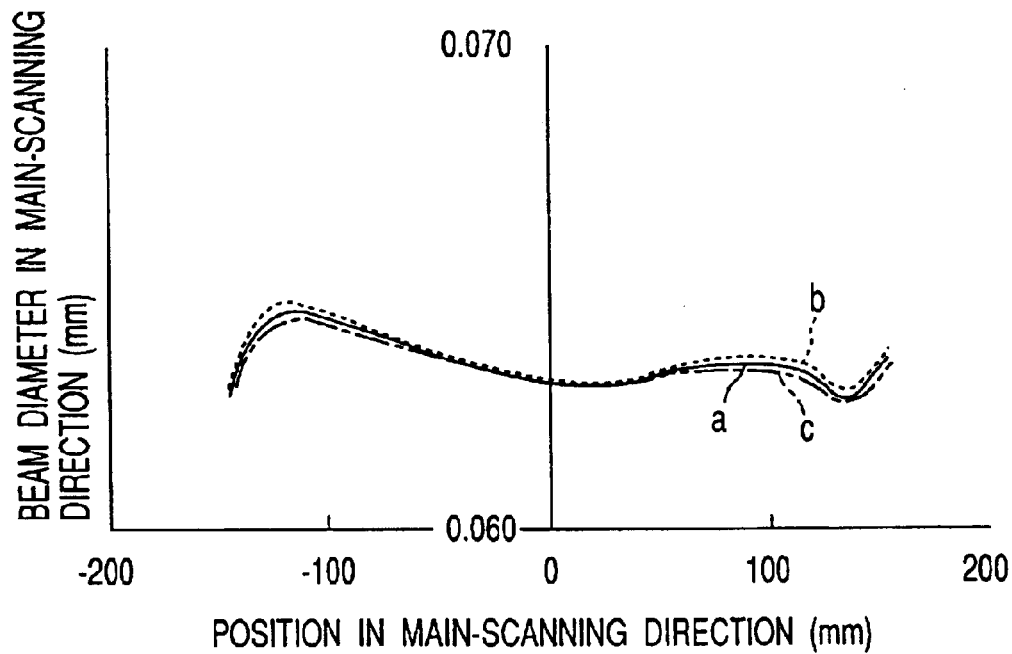
FIG. 28 is a graph showing a beam diameter in a main-scanning direction of the optical scanning device of the fifth embodiment.
Figure 29:
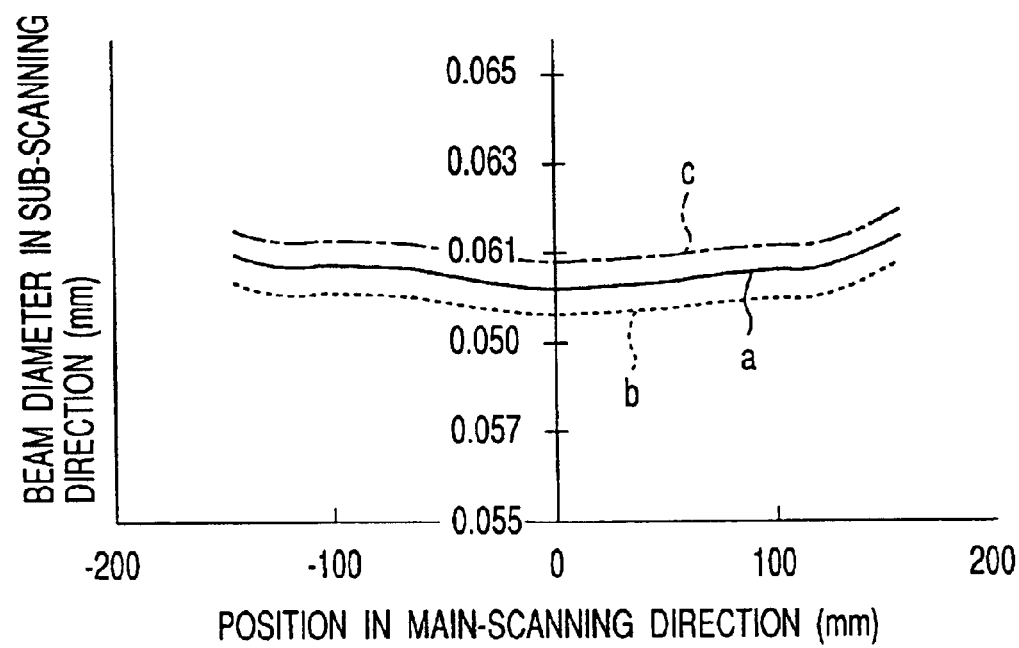
FIG. 29 is a graph showing the beam diameter in a sub-scanning direction of the optical scanning device of the fifth embodiment.
Figure 30:
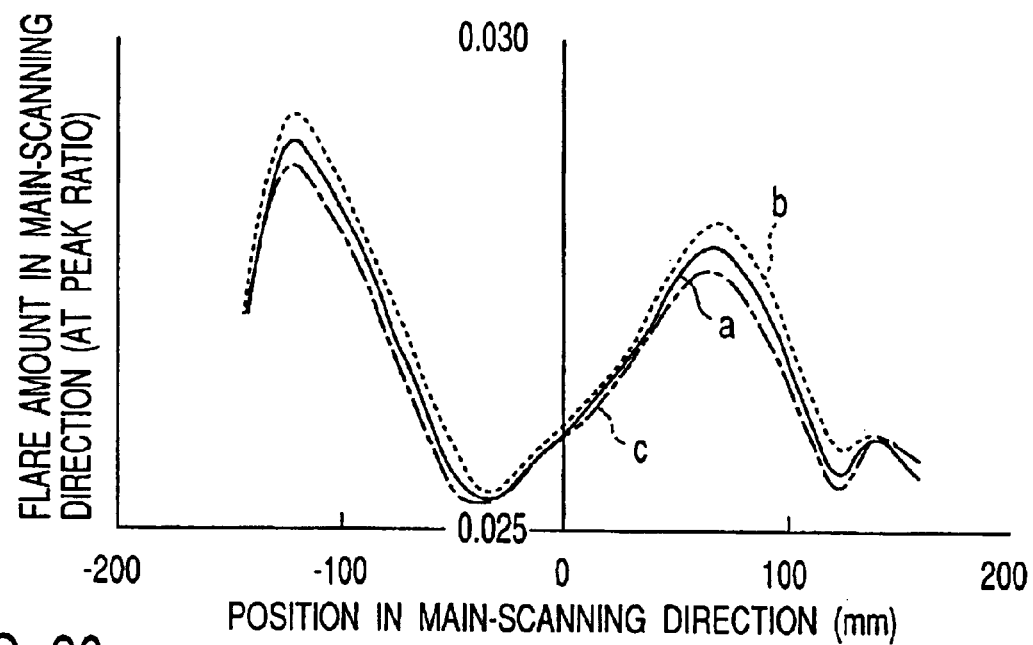
FIG. 30 is a graph showing a flare amount in the main-scanning direction of the optical scanning device of the fifth embodiment.
Figure 31:
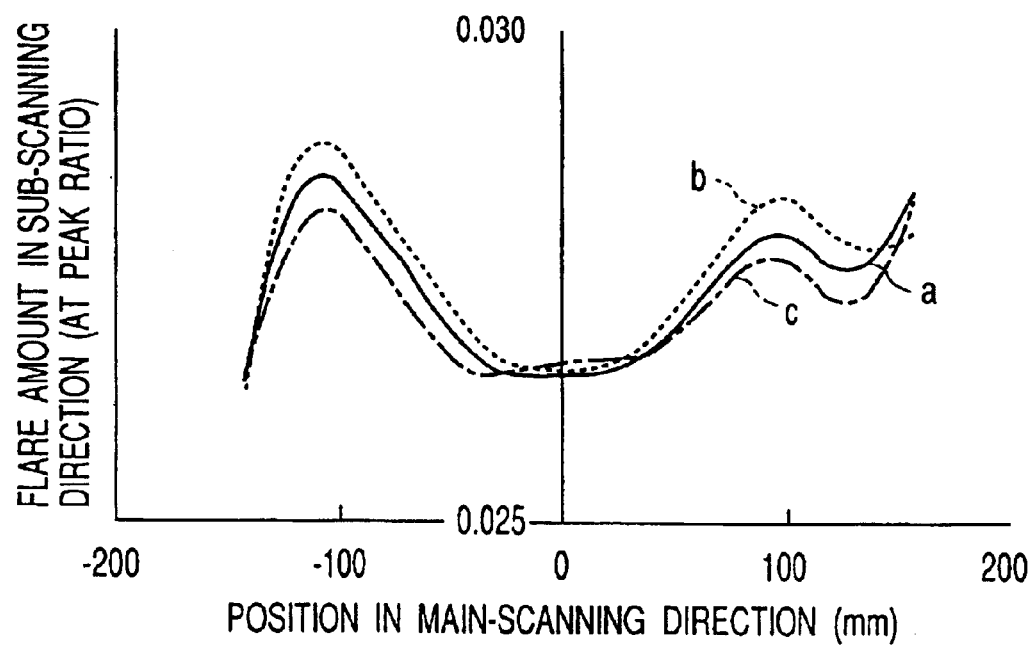
FIG. 31 is a graph showing the flare amount in the sub-scanning direction of the optical scanning device of the fifth embodiment.

This fact can be found from the fact that the entire RMS-OPD could be improved as compared with the conventional example from the comparison between FIG. 8 and FIG. 26, and the fact that the flare amount in the sub-scanning direction could be reduced in the vicinity of the center from the comparison between FIG. 13 and FIG. 31. In addition, if FIGS. 10, 23 and FIGS. 12, 30 are compared, it is found that the beam diameter in the main-scanning direction and the temperature dependence of the flare amount are also reduced.

Further, the conventional plastic cylinder lens of the hybrid lens is replaced by the lens having a holding surface having negative power in the sub-scanning direction, the plastic lens and the glass cylinder lens have space portions while sandwiching the one-side convex surface, the second resin lens has the projection abutting in the one-surface convex direction, or the resin lens and the glass cylinder lens have the space portion while sandwiching the one-surface convex and the deformable sheet having a substantially constant thickness is inserted in therebetween. In order to provide the automatic centering function for correcting the inclination of the two lenses in the region through which the beams do not pass, the glass lens and the plastic surface are connected with each other at the convex portion of the glass lens and the surface having the curvature, and the glass and the plastic lens do not come into contact with each other at the position where the beams pass. With this structure, even if the shape of the plastic lens is slightly varied, it is possible to prevent the curvature from being varied abruptly, and to prevent the flare and the beam diameter from increasing in the image surface.

As explained above, according to the optical scanning device of the present invention, in a single color or color laser beam printer, a digital copier and the like, it is possible to provide an inexpensive and highly reliably beam scanner capable of reducing the temperature dependency and providing fine image while reducing the beams on the image surface in which a portion or all of a post deflecting lens is made of plastic.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical scanning device comprising:
   a light source;
   forwardly deflecting optical set including a first lens for providing light beams from said light source with a predetermined characteristic, and a second lens for converging said light beams from said first lens in a first direction;
   a polygonal mirror unit for deflecting the light beams from said forwardly deflecting optical set into a second direction substantially perpendicular to said first direction;
   a third lens for forming the light beams deflected by said polygonal mirror unit as an image onto a predetermined image surface at substantially equal speed;
   wherein said second lens includes a resin lens including a surface having a negative power in said first direction, and a glass lens including one convex surface having a positive power in said first direction, said resin lens of said second lens includes a projection which abuts in a direction of said convex surface of said glass lens, and wherein the projection of said resin lens and said glass cylinder lens contact with each other.

2. The optical scanning device according to claim 1, wherein the resin lens of said second lens having a surface that is in contact with said convex surface of said glass lens in a region through which the light beams does not pass and provided at its side closer to said convex surface of said glass lens with a surface of a curvature different from a curvature of said convex surface of said glass in a region through which the light beams pass.

3. An optical scanning device comprising:

a light source;

forwardly deflecting optical set including a first lens for providing light beams from said light source with a predetermined characteristic, and a second lens for converging said light beams from said first lens in a first direction;

a polygonal mirror unit for deflecting the light beams from said forwardly deflecting optical set into a second direction substantially perpendicular to said first direction;

a third lens for forming the light beams deflected by said polygonal mirror unit as an image onto a predetermined image surface at substantially equal speed;

wherein said second lens includes a resin lens including a surface having a negative power in said first direction, and a glass lens including one convex surface having a positive power in said first direction, a deformable sheet having a substantially constant thickness is provided between said resin lens and said glass cylinder lens, and each of said resin lens and said glass cylinder lens has a space portion when both the lenses come into contact with each other.

* * * * *